(12) United States Patent
Jenkins

(10) Patent No.: US 7,717,665 B2
(45) Date of Patent: May 18, 2010

(54) PALLET STACKER SYSTEM

(75) Inventor: Gary E. Jenkins, Mason, OH (US)

(73) Assignee: Kolinahr Systems, Inc., Cincinnati, OH (US)

( * ) Notice: Subject to any disclaimer, the term of this patent is extended or adjusted under 35 U.S.C. 154(b) by 0 days.

(21) Appl. No.: 10/973,367

(22) Filed: Oct. 26, 2004

(65) Prior Publication Data

US 2005/0095114 A1     May 5, 2005

Related U.S. Application Data

(60) Provisional application No. 60/516,792, filed on Nov. 3, 2003.

(51) Int. Cl.
*B65H 29/00*     (2006.01)
*B65G 57/30*     (2006.01)
*B65G 59/00*     (2006.01)

(52) U.S. Cl. .............. 414/795.2; 414/797.5; 414/674; 187/360; 254/89 R

(58) Field of Classification Search ............ 414/789.7, 414/789.9, 795.2, 795.3, 794.9, 674, 802, 414/927; 198/463.3; 187/238, 360
See application file for complete search history.

(56) References Cited

U.S. PATENT DOCUMENTS

| | | | | |
|---|---|---|---|---|
| 2,184,801 A | * | 12/1939 | McCarthy | 187/214 |
| 3,325,021 A | * | 6/1967 | Burns et al. | 414/795.8 |
| 3,478,897 A | * | 11/1969 | Dykeman | 414/790.1 |
| 3,543,884 A | * | 12/1970 | Riedner | 187/369 |
| 3,765,546 A | * | 10/1973 | Westerling | 414/795.2 |
| 3,807,553 A | * | 4/1974 | Billett et al. | 209/565 |
| 3,907,274 A | * | 9/1975 | D'Amato et al. | 271/300 |
| 4,212,579 A | | 7/1980 | Stromberg | 414/95 |
| 4,273,488 A | | 6/1981 | Hill et al. | 414/44 |
| 4,392,554 A | * | 7/1983 | Russey | 187/226 |
| 4,442,922 A | * | 4/1984 | Johannson | 187/238 |
| 4,632,620 A | | 12/1986 | Wiggers | 414/95 |
| 4,704,060 A | * | 11/1987 | Winski et al. | 414/792.6 |
| 5,025,512 A | * | 6/1991 | Niimura | 4/495 |
| 5,232,331 A | * | 8/1993 | Kasai et al. | 414/802 |
| 5,764,023 A | * | 6/1998 | Wieloch | 318/803 |
| 6,422,536 B1 | * | 7/2002 | Kelley et al. | 254/89 R |
| 6,422,806 B1 | | 7/2002 | Jenkins et al. | 414/795.2 |

OTHER PUBLICATIONS

Newcastle Company, Inc., *Newcastle Load Stacking Systems*, Brochure (Stacker-FO99).

* cited by examiner

*Primary Examiner*—Gregory W Adams
(74) *Attorney, Agent, or Firm*—Wood, Herron & Evans, LLP

(57) ABSTRACT

A method and apparatus for stacking first and second loaded pallets includes a pallet stacker that defines a stationary stacking location. A first loaded pallet is conveyed to the stationary stacking location. A pair of pallet lift carriages are vertically adjustable at the stationary stacking location to selectively engage the first loaded pallet and raise it to a temporary holding position. A second loaded pallet is conveyed into vertical registration with the first loaded pallet. The first loaded pallet is then vertically adjusted into stable stacked relation with the second loaded pallet, and the pallet lift carriages disengage the first loaded pallet. The first and second loaded pallets, in stable stacked relation to each other, thereafter are discharged from the stationary stacking location.

16 Claims, 15 Drawing Sheets

PALLET STACKER SYSTEM

The present application claims the filing benefit of pending U.S. Provisional Application Ser. No. 60/516,792, filed Nov. 3, 2003, the disclosure of which is hereby incorporated herein by reference in its entirety.

FIELD OF THE INVENTION

The present invention relates generally to loaded pallets and, more particularly, to an improved system for stacking loaded pallets one on top of the other.

BACKGROUND OF THE INVENTION

Pallets, e.g., wood pallets, are used to store and transport loads of a vast range of goods. For example, a pallet can be used to transport boxes of goods that have been stacked and stretch wrapped or otherwise secured upon the pallet from a manufacturer to a point of sale. Of course, a pallet carrying a full load can be very large and heavy and, therefore, difficult, dangerous and time consuming to move within a warehouse, for example. And oft times two loaded pallets are stacked one on top of the other for handling time and/or storage efficiency reasons.

One type of known pallet moving and stacking system simply employs a first forklift truck to move a first loaded pallet to a stacking location, whereat either the first forklift truck must retrieve a second loaded pallet to stack upon the first loaded pallet, or a second forklift truck is employed to stack the second loaded pallet upon the first loaded pallet. Then, a forklift truck must lift the first and second stacked and loaded pallets from the stacking area and move them to a storage location. This system for moving and stacking pallets is time consuming and can be dangerous. Using a first forklift truck with or without a second forklift truck helping stack loaded pallets requires the time and attention of at least one employee, and is relatively slow. Because using forklifts requires at least one forklift operator, moving and stacking pallets by this system also is prone to human error. For example, an operator could have an accident, toppling an upper loaded pallet from a lower loaded pallet on the forklift, and possibly endangering other employees.

Automated pallet moving and stacking systems are also known in the prior art. In a first type of stacking system, a vertically adjustable fork travels generally horizontally back and forth perpendicular to a conveyor. The fork picks up a first loaded pallet provided on the conveyor, and elevates that pallet above the conveyor. A second loaded pallet is conveyed into position under the elevated first pallet which is then set down upon the second loaded pallet. This system has a large operating footprint. That is, the conveyor and traveling fork system takes up a significant space within a warehouse, along a loading dock, or other location having a large enough floor space which could otherwise be used more efficiently.

In a second known automated pallet stacking system, a conveyor transports a first loaded pallet to a scissors-lift table. The scissors-lift table lifts the first loaded pallet and, in the lifted position, a fork engages the pallet. The scissors-lift table then retracts back to the level of the conveyor. A second loaded pallet is then conveyed to the scissors-lift table. The scissors-lift table raises the second loaded pallet into engagement with the first loaded pallet held by the retractable fork. The fork then retracts from engagement with the first loaded pallet, the scissors-lift table is lowered, and the first and second loaded pallets are thereafter moved away from the scissors-lift table to a desired location. In order to use a scissors-lift table system, an existing conveyor system must be retrofitted to accommodate the scissors-lift table itself. And this system also uses significant floor space because of the retractable fork.

In the above mentioned automated systems which are hydraulic powered, maintenance is time consuming, difficult and messy when dealing with hydraulic fluids. Also, the hydraulic systems are expensive to maintain and require compliance with environmental regulations regarding hydraulic fluid disposal.

Therefore, there is a need for an improved stacking system for loaded pallets whereby the efficiency of stacking loaded pallets is enhanced over prior art systems.

There is also a need to provide an improved system for stacking loaded pallets which occupies less space, i.e., has a smaller floor footprint, than prior art pallet stacking systems.

There is yet also a need to provide an improved stacking system for loaded pallets in which cost and frequency of maintenance is reduced relative to prior art systems.

SUMMARY OF THE INVENTION

The present invention overcomes the foregoing and other shortcomings and drawbacks of pallet stackers and methods of stacking loaded pallets heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a modular pallet stacker is provided for stacking loaded pallets one on top another in which a first loaded pallet is stacked upon a second loaded pallet within a stationary work station with a pair of vertically adjustable pallet lift carriages in operational engagement with the work station. The pallet stacker of the present invention is capable of stacking more than two loaded pallets as well. The pallet lift carriages engage the first loaded pallet at an entry position in the work station, and vertically adjust the first loaded pallet to a temporary holding position within the work station, which holding position is at a vertical location different from the entry position of the first loaded pallet. The work station then receives a second loaded pallet at the entry position in vertical registration with the first loaded pallet held in the temporary holding position. The pallet lift carriages are then vertically adjusted until the first loaded pallet is received in stacked relation with the second loaded pallet.

According to one aspect of the present invention, the pallet stacker advantageously uses a pair of elongated, vertically oriented support columns located on opposite sides of the pallet conveyor used to convey the first and second loaded pallets to the work station. The pair of pallet lift carriages are mounted for sliding vertical movement relative to their respective support columns so as to be located on opposite sides of the pallet conveyor and vertically adjustable, i.e, raised or lowered, within the work station. Due to its unique construction, the pallet stacker of the present invention uses a minimal amount of floor space for a pallet stacking operation.

Each pallet lift carriage of the pallet stacker has a pallet lift foot assembly mounted for sliding horizontal movement into selective engagement with one of the respective sides of the pallet during a pallet stacking operation. The pallet lift foot assemblies each include a pair of pallet lift feet which support a loaded pallet thereupon during vertical movement of the pallet lift carriages to load the first loaded pallet in stacked relation with the second loaded pallet within the stationary work station.

According to another aspect of the present invention, the pallet stacker uses a drive system and a rotary drive shaft to provide upward and downward movement of the pallet lift carriages. In one embodiment, the drive system has an electric brake motor located near a base of the pallet stacker which simplifies maintenance of the system. The drive system further has a variable frequency drive controller for controlling operation of the electric brake motor. In one embodiment, the drive shaft is segmented into multiple drive shaft sections, with the drive shaft sections coupled to each other through universal joints. This allows the pallet stacker of the present invention to be readily installed and operated at locations where the floor at the pallet stacker is uneven.

According to yet another aspect of the present invention, a separate drive chain is mounted in operational engagement with the drive shaft and each of the pair of pallet lift carriages. Each drive chain is supported for rotation with the rotary drive shaft about a drive sprocket supported by the drive shaft and a driven sprocket supported at the top of each support column. A chain attachment mechanism is provided to securely connect each end of the drive chains to their respective pallet lift carriages. Each of the chain attachment mechanisms has a pair of chain clamping members located on opposite sides of each drive chain end which, in clamped relation, are configured to extend into multiple chain links of each chain end and engage with link pins of the clamped chain links.

According to still another aspect of the present invention, a spring-loaded chain tensioner is provided to tension the drive chains about their respective pairs of drive and driven sprockets. The chain tensioner, while properly tensioning the drive chains about their respective pairs of drive and driven sprockets, provides sufficient "play" so that the drive chains are capable of jumping their respective drive sprockets. In this way, the vertical positions of the pallet lift carriages may be readily synchronized. A sensor is associated with each chain tensioner and is operable to detect a change in the configuration of the chain tensioner which indicates that pallet stacker has jammed. The sensor is electrically coupled to a programmable logic controller (PLC) of the pallet stacker and causes the PLC to stop operation of the pallet stacker when a jam condition is detected.

According to another aspect of the present invention, the pallet stacker has a locking mechanism associated with each of the pallet lift carriages in order to provide a safe work environment for those in proximity to the pallet stacker and to guard against undesired movement of the pallet lift carriages due to motor malfunction.

A method in accord with the present invention for automatically stacking first and second loaded pallets, one on top of the other, is provided by locating a first loaded pallet in an entry position at a stationary work station where a pair of vertically adjustable pallet lift carriages engage the first loaded pallet and vertically adjust the first loaded pallet to a temporary holding position above the entry position in the stationary work station.

According to yet another aspect of the present invention, a photo eye sensor is provided to detect the height of the second loaded pallet approaching the pallet stacker and causes the pallet stacker to stop continued upward movement of the first loaded pallet when the pallet lift carriages are located a predetermined distance above the sensed height of the incoming second loaded pallet. By sensing the height of the incoming second loaded pallet, and moving the pallet lift carriages only to a height sufficient to clear the top of the second loaded pallet, the pallet stacker minimizes inefficient movement of the pallet lift carriages during the pallet stacking operation.

Thereafter, the second loaded pallet is located in the entry position of the stationary work station and the first loaded pallet is moved in a reverse direction downwardly from its temporary holding position into stacked relation with the second loaded pallet. By moving the first loaded pallet in a vertical direction above the entry position of the stationary work station to the temporary holding position and, thereafter, positioning the second loaded pallet in the entry position of the stationary work station to receive the first loaded pallet thereon, the present invention provides a method for stacking loaded pallets which occupies a relatively small floor space footprint when compared to prior art pallet stacking methods. The present inventive method may be employed with an existing conveyor system rather than prior art pallet stacking methods which may require substantial modification to existing conveyor systems.

The features and objectives of the present inventive pallet stacking system will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
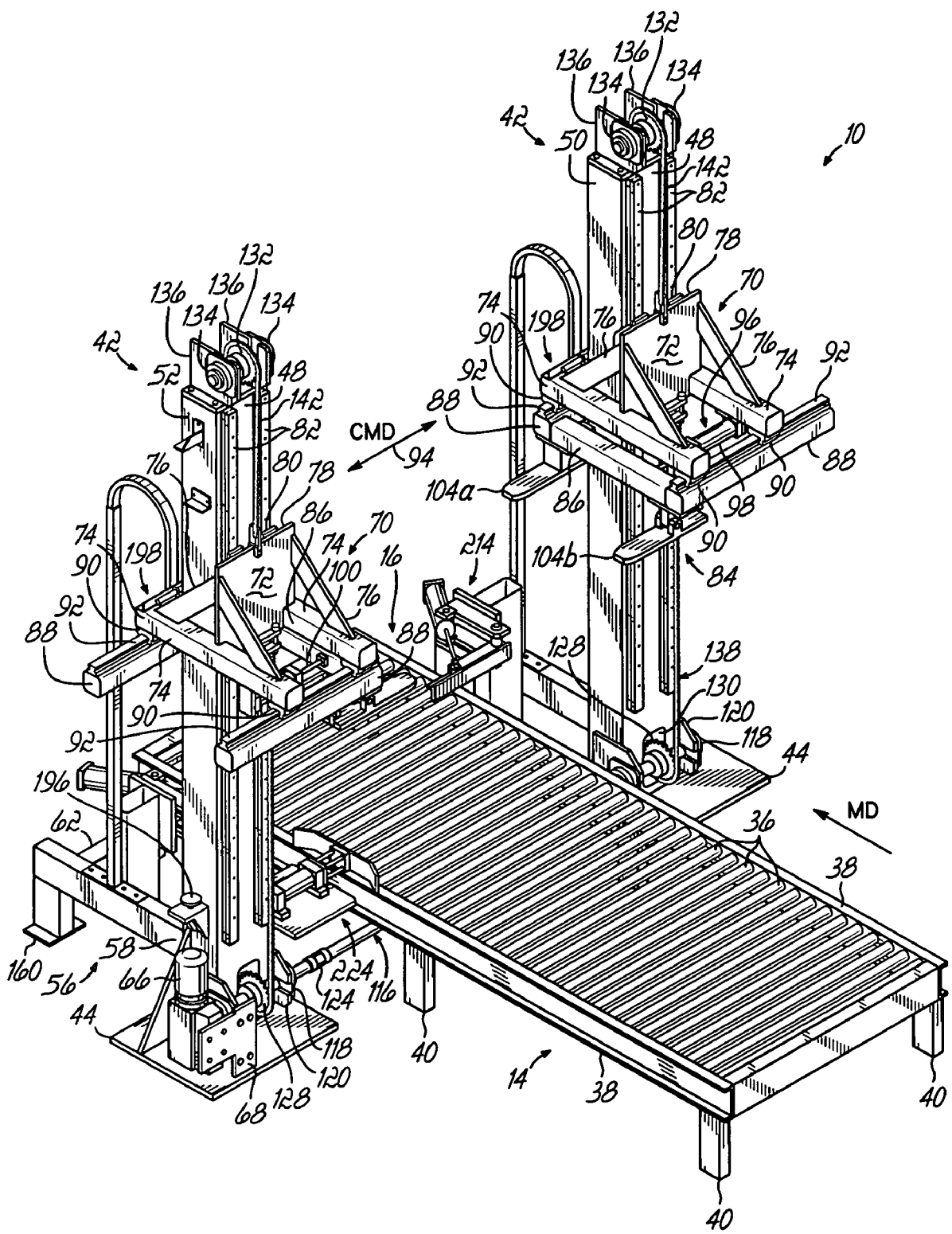
FIG. 1 is a perspective view of a pallet stacker in accordance with principles of the present invention.

Referring to FIG. 1, a modular pallet stacker 10 in accordance with the principles of the present invention is provided that is adapted to stack loaded pallets 12 carried to the pallet stacker 10 by a conventional conveyor system 14, the stacker defining a stationary work station 16 relative to floor 18. A typical pallet 20 known in the art generally includes a planar top member (not shown) and a planar base member (not shown) spaced from each other which define a gap 22 (FIGS. 2A and 7) between the top member and bottom member. The pallet stacker 10 of the present invention can handle a wide range of unit load sizes and pallet styles.

Figure 7:
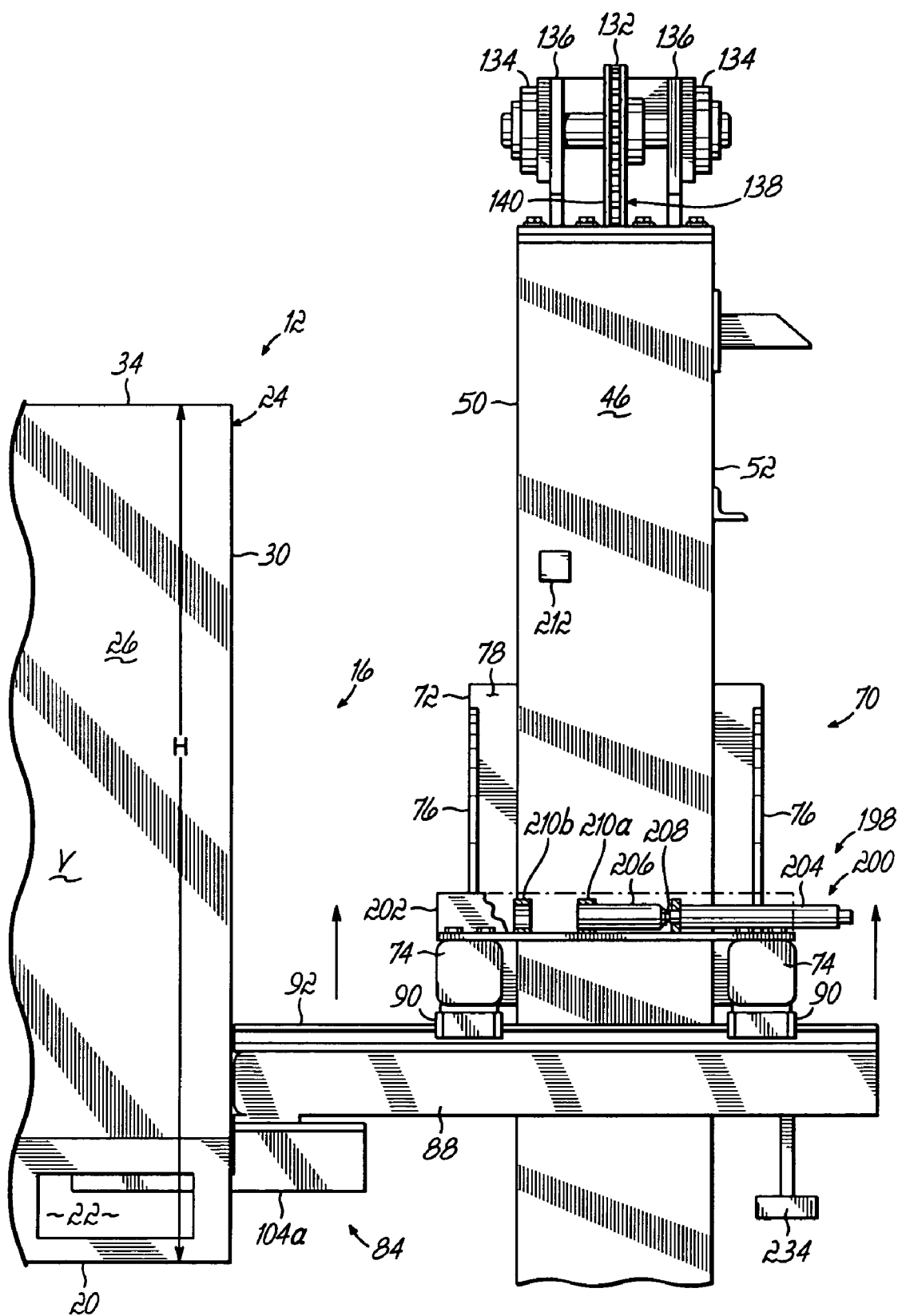
FIG. 7 is a partial front plan view of the pallet stacker of FIG. 1, illustrating a pallet lift carriage locking mechanism of the pallet stacker in accordance with the principles of the present invention and showing the locking mechanism in an "unlocked" position.

Prior to being transported to the pallet stacker 10, a pallet 20 receives a load 24, for example, plural boxes, polybags or other load items from a pallet loader (i.e., "palletizer") (not shown). It is the objective of the automatic pallet loader to stack a load 24 on each pallet 20 having a preferred load height H and a preferred load integrity V as shown in FIG. 7. The preferred load integrity V is defined for the purposes of this disclosure as a load 24 with substantially vertical and complete opposing front 26 and rear 28 surfaces, opposing side surfaces 30, 32 and a substantially horizontal top surface 34. In other words, a pallet 20 with a load 24 having a preferred load integrity V means a load that is stacked on the pallet in such a fashion as to be able to support a second upper pallet (with a second load) on the top surface 34 of the load of a first lower pallet without the upper loaded pallet causing a potential tipping or falling, i.e., safety, problem after it has been stacked on top of the lower loaded pallet. The preferred load height H is defined for the purposes of this disclosure as the height of a pallet 20 with load 24 thereon as measured from the pallet base member (not shown) to the load top surface 34 as shown in FIG. 7. Also, as discussed more fully below, the present inventive pallet stacker 10 may be adapted to accept loaded pallets of varying preferred load heights H.

Figure 8:
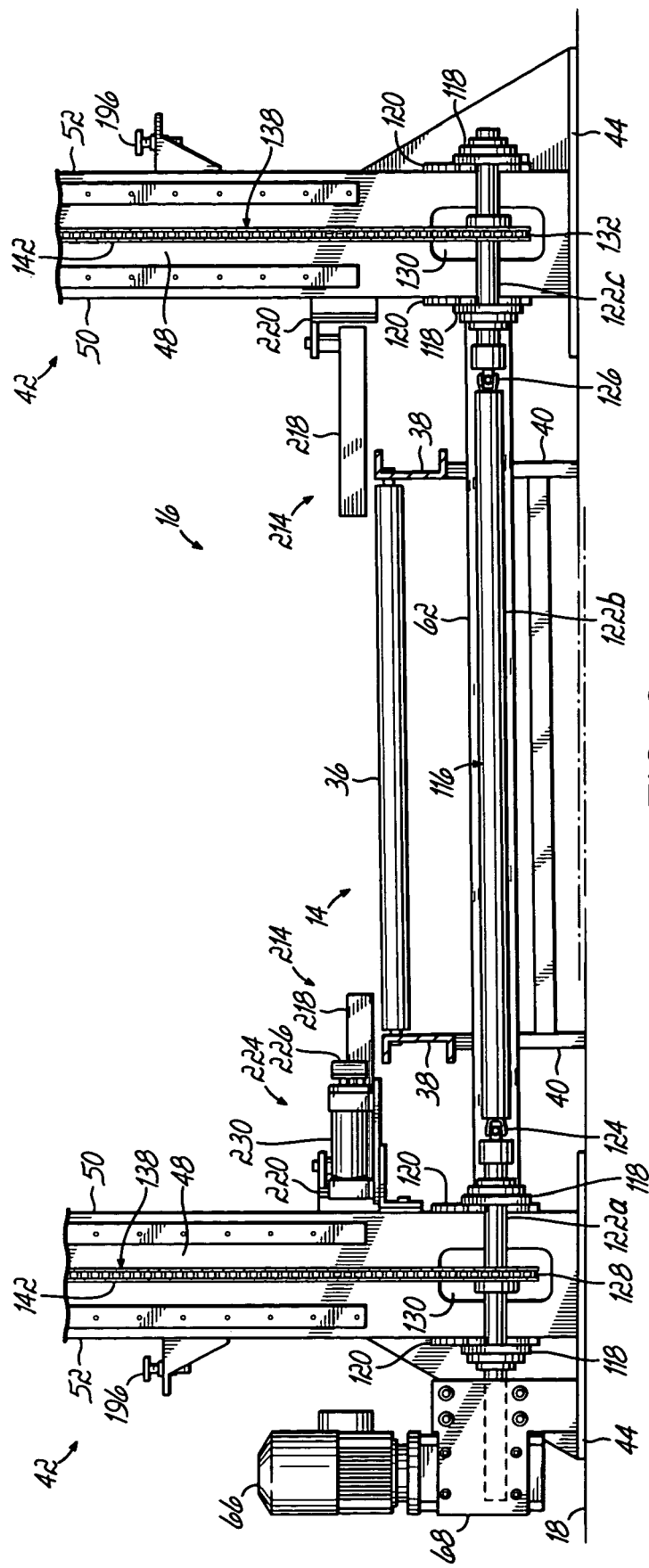
FIG. 8 is partial rear view of the pallet stacker of FIG. 1, illustrating a segmented drive shaft of the pallet stacker in accordance with the principles of the present invention.

The modular pallet stacker 10 is operatively positioned on opposite sides of an existing conveyor system 14 as shown in FIGS. 1 and 8. The conveyor system 14 generally has plural rollers 36 extending between parallel rails 38 supported by legs 40. The modular pallet stacker 10 may be configured to operate with any conventional conveyor system 14 known in the art as long as a sufficient clearance exists above the conveyor system 14 for operation of the pallet stacker 10. As discussed further below, the pallet stacker 10 is particularly advantageously employed with known roller conveyor systems, although other conveyor systems are possible as well without departing from the spirit and scope of the present invention.

While operation of the pallet stacker 10 preferably is entirely automatically controlled by a programmable logic controller (PLC) system contained in a control box (not shown) located near the area of the pallet stacker 10, the pallet stacker 10 may be manually operated from the same control box in the event of, for instance, maintenance of the pallet stacker 10. One suitable PLC for use in the pallet stacker 10 of the present invention is the Model No. SLC 5/04 PLC commercially available from Allen Bradley of Milwaukee, Wis. Of course, other commercially available PLC's or other types of controllers are possible as well without departing from the spirit and scope of the present invention. The PLC (not shown) of the pallet stacker 10 is electrically coupled to a data bus (not shown) common to an upstream stretchwrapper (not shown) and palletizer (not shown). By tracking the loaded pallets approaching the pallet stacker 10 via a data stream from the palletizer (not shown), the PLC (not shown) allows non-matching or partial loaded pallets to pass through the pallet stacker 10.

Figure 3:
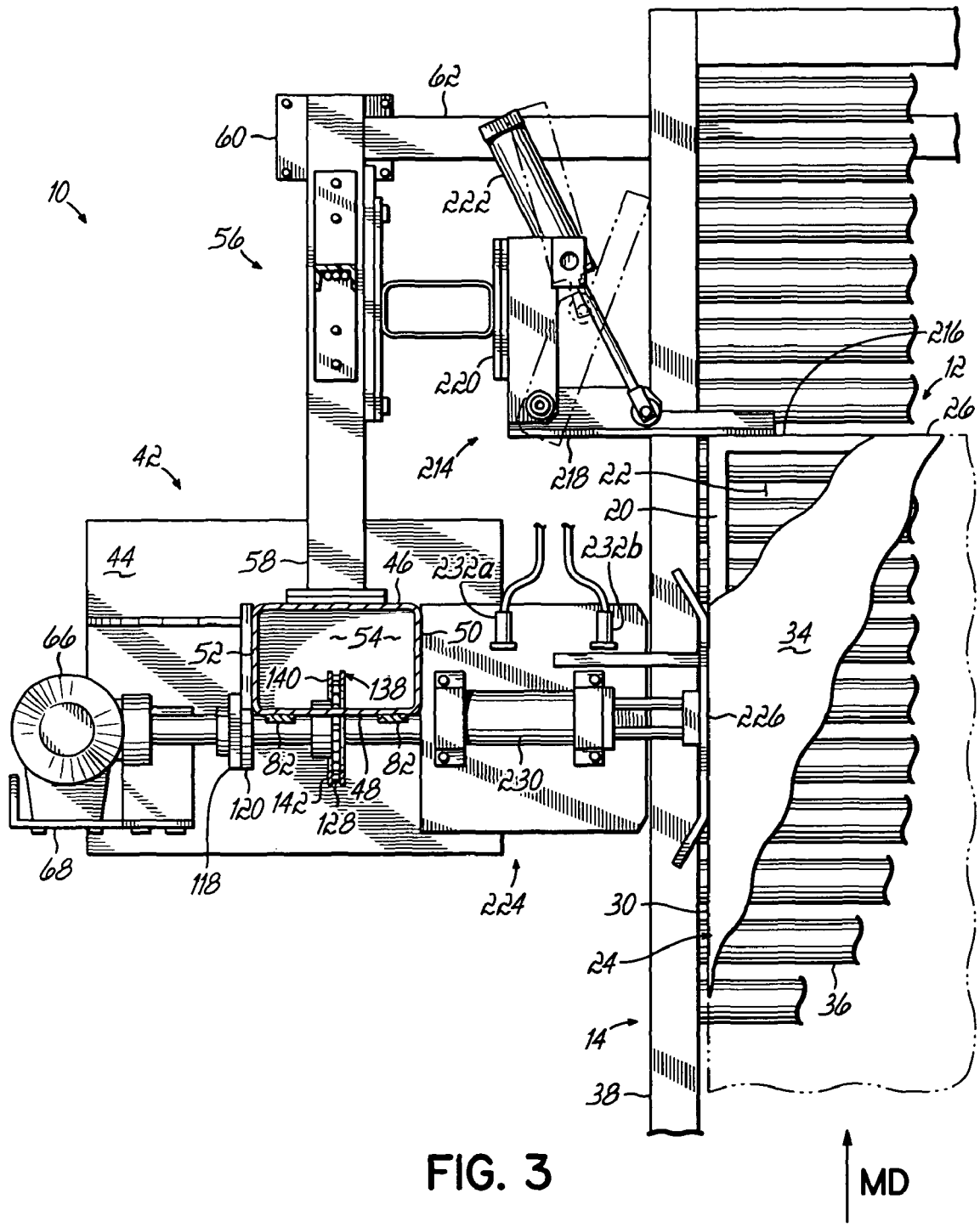
FIG. 3 is a partial top plan view of the pallet stacker of FIG. 1, illustrating pallet stops and pallet alignment devices of the pallet stacker.
Figure 4:
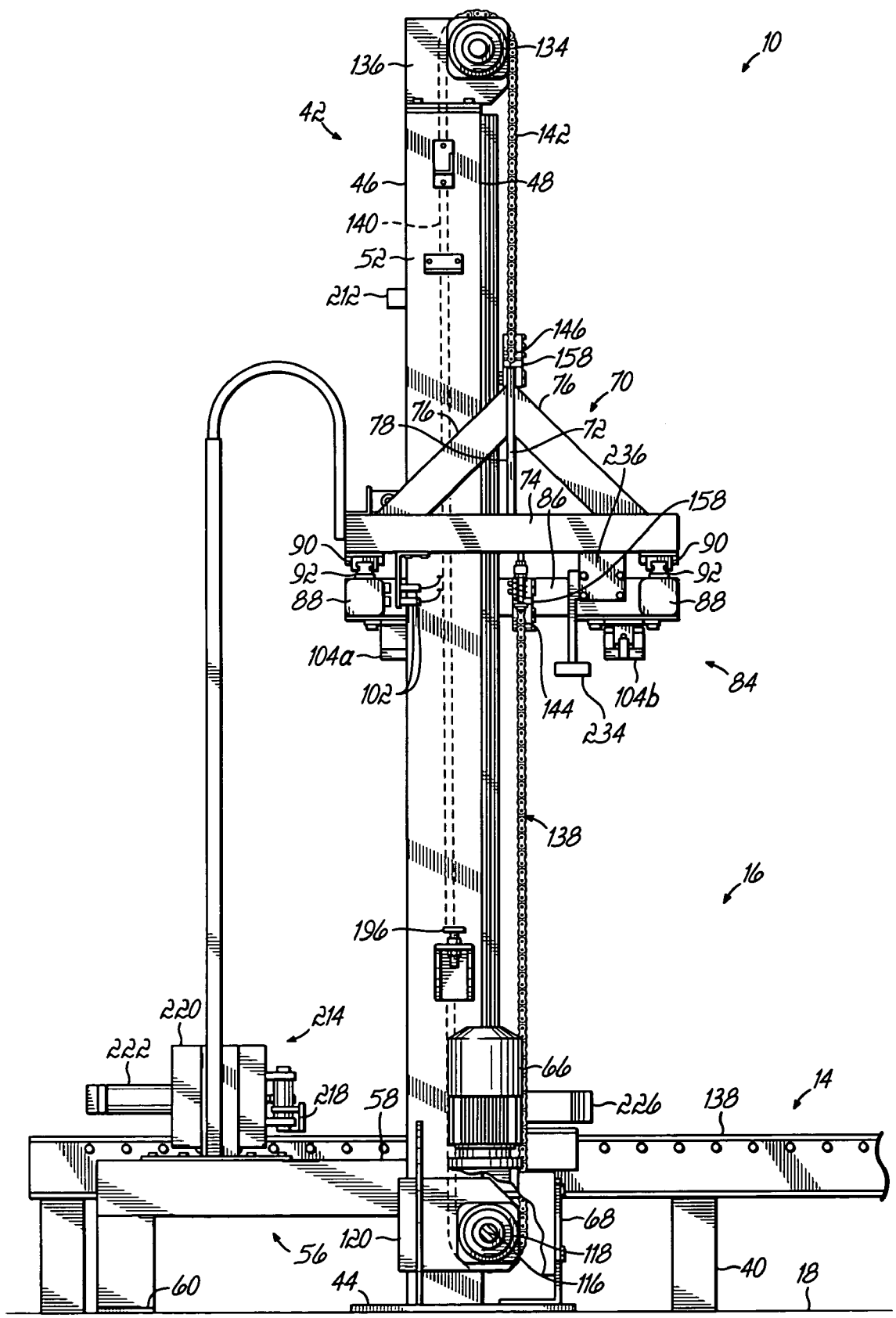
FIG. 4 is a partial side plan view of the pallet stacker of FIG. 1.

In accordance with one aspect of the present invention, the pallet stacker 10 includes a pair of elongated, vertically oriented support columns 42 located on opposites sides of the conveyor 14 with each support column 42 having a base 44 mounted on the floor 18 as shown in FIGS. 1 and 8. In one embodiment, each support column 42 comprises a sturdy steel tubular structure having opposite front and rear sides 46 and 48 joined by opposite inner and outer sides 50 and 52, respectively, which define an elongated, vertically oriented chamber 54 within each support column 42 as shown in FIG. 3. Each support column 42 has a support brace 56 extending forwardly in the machine direction (MD) having one end 58 mounted to the front side 46 of the support column 42 and a base 60 mounted on the floor 18 as shown in FIGS. 1, 3 and 4. The pair of support braces 56 are connected by a cross machine direction (CMD) member 62 extending beneath the conveyor 14 to enhance the structural integrity of the pallet stacker 10. The pallet stacker 10 defines a stationary stacking location or work station 16 between the pair of support columns 42, through which the conveyor 14 is directed, in order to provide successively first and second loaded pallets 12, 64 within the work station 16.

Figure 2:
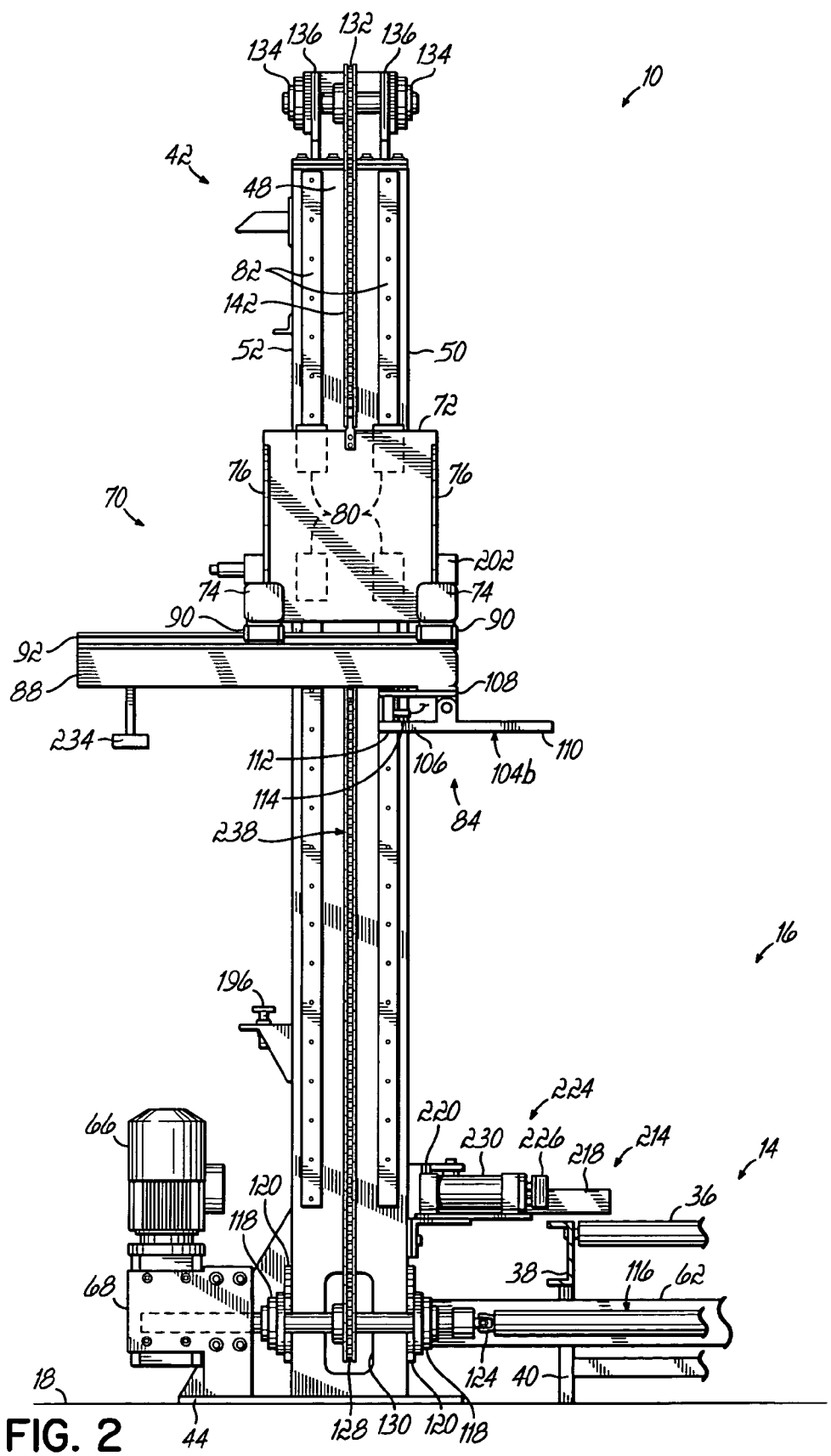
FIG. 2 is a partial rear plan view of the pallet stacker of FIG. 1.

As shown in FIGS. 1 and 2, a drive system 66 having a conventional rotary output (not shown) is mounted to a drive mounting plate 68 near the base of the pallet stacker 10 as discussed in greater detail below. The drive system 66 may include a variable frequency drive controller, such as the PowerFlex 70 drive controller commercially available from Allen Bradley of Milwaukee, Wis., and an electric brake motor, such as the DFT 100L electric brake motor commercially available from SEW-EURODRIVE of Lyman, South Carolina, although the present invention contemplates any other type of drive system capable of providing a rotary output as will be understood to those of ordinary skill in the art.

In accordance with another aspect of the present invention, a pair of pallet lift carriages 70 are mounted for vertical movement relative to their respective support columns 42 so as to be located on opposite sides of the conveyor 14 and vertically adjustable, i.e., raised and lowered, within the work station 16. As shown in FIGS. 1 and 2, each pallet lift carriage 70 has a vertically oriented mounting plate 72 which supports a pair of spaced and parallel machine direction (MD) members 74 mounted thereto. The members 74 are welded or otherwise joined to the mounting plate 72 and braces 76 are connected between the mounting plate 72 and the members 74 to enhance structural integrity of the assembly. A front side 78 of each mounting plate 72 supports linear bearings 80 (FIG. 2) which are journaled in a conventional manner with a pair of spaced and parallel rails or tracks 82 mounted in vertical orientation on the rear side 48 of each support column 42. In this way, the mounting plates 72, and structure associated therewith, are mounted for sliding vertical movement, i.e., to be raised and lowered, relative to their respective support columns 42 as described further below.

Each pallet lift carriage 70 further has a pallet lift foot assembly 84 mounted for selective engagement with one of the respective sides of the pallet 20 during a pallet stacking operation as described in greater detail below. Each pallet lift foot assembly 84 has a machine direction (MD) inner member 86 and a pair of spaced and parallel cross machine direction (CMD) members 88 mounted thereto and extending respectively from opposite ends of the inner member 86. As shown in FIGS. 1 and 2, each of the pair of machine direction (MD) members 74 supported by the respective mounting plates 72 has a pair of linear bearing blocks 90 mounted beneath the respective members 74 at opposite ends thereof. Each cross machine direction (CMD) member 88 of the respective pallet lift foot assemblies 84 has an elongated rail or track 92 mounted on a top side thereof which is journaled in a conventional manner with the linear bearing blocks 90 mounted beneath the respective machine direction (MD) members 74 of the pallet lift carriages 70. In this way, the pallet lift foot assemblies 84 are mounted for sliding horizontal movement in the cross machine direction (CMD) as indicated by arrows 94 in FIG. 1 into selective engagement with opposite sides of the pallet 90 as described in greater detail below.

In order to facilitate horizontal movement of the pallet lift foot assemblies 84 in the cross machine direction as indicated by the CMD arrows 94 in FIG. 1, each pallet lift foot assembly 84 is connected to an air actuated cylinder assembly 96 which is mounted beneath the respective pair of machine direction (MD) members 74 supported by the respective mounting plates 72. Each cylinder assembly 96 has an air pressure actuated cylinder 98 connected to the outermost of the respective pair of machine direction (MD) members 74 and a cylinder rod 100 connected to the machine direction (MD) inner member 86 of each respective pallet lift foot assembly 84. Each cylinder rod 100 travels in and is actuated by the respective air pressure actuated cylinders 98 so as to be extendable and retractable relative thereto to extend and retract each pallet lift foot assembly 84 in the cross machine direction (CMD) within the work station 16. Sensors 102 (FIG. 4) are mounted to each of the respective pallet lift carriages 70 and electrically coupled to the controller (not shown) of the pallet stacker 10 to indicate the extended or retracted position of each pallet lift foot assembly 84. Each air cylinder 98 is coupled to an air compressor system (not shown) known in the art to facilitate movement of the cylinder rod 100.

Figure 2A:
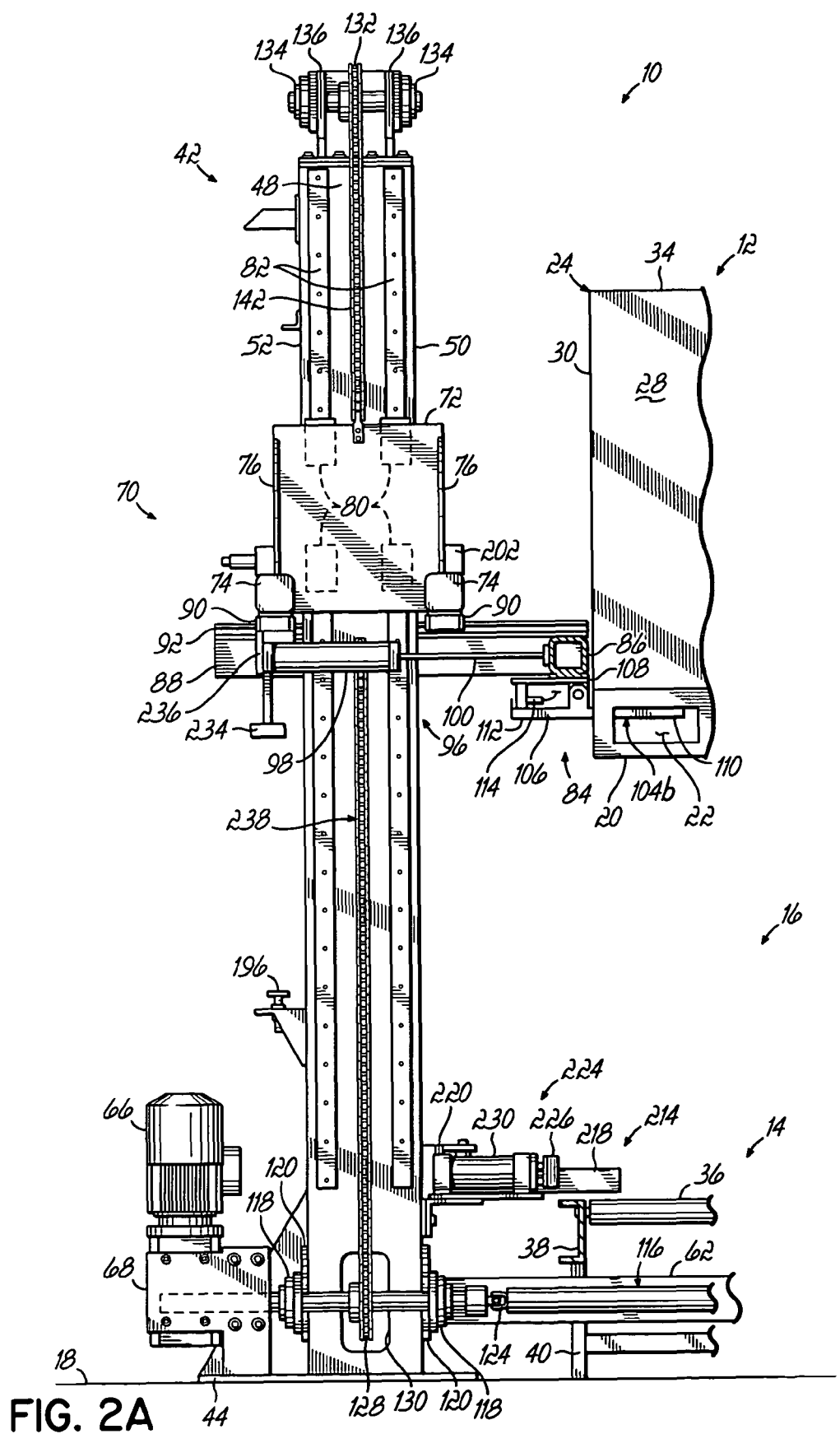
FIG. 2A is a view similar to FIG. 2, illustrating the pallet stacker in a raised position and supporting a first loaded pallet.
Figure 7A:
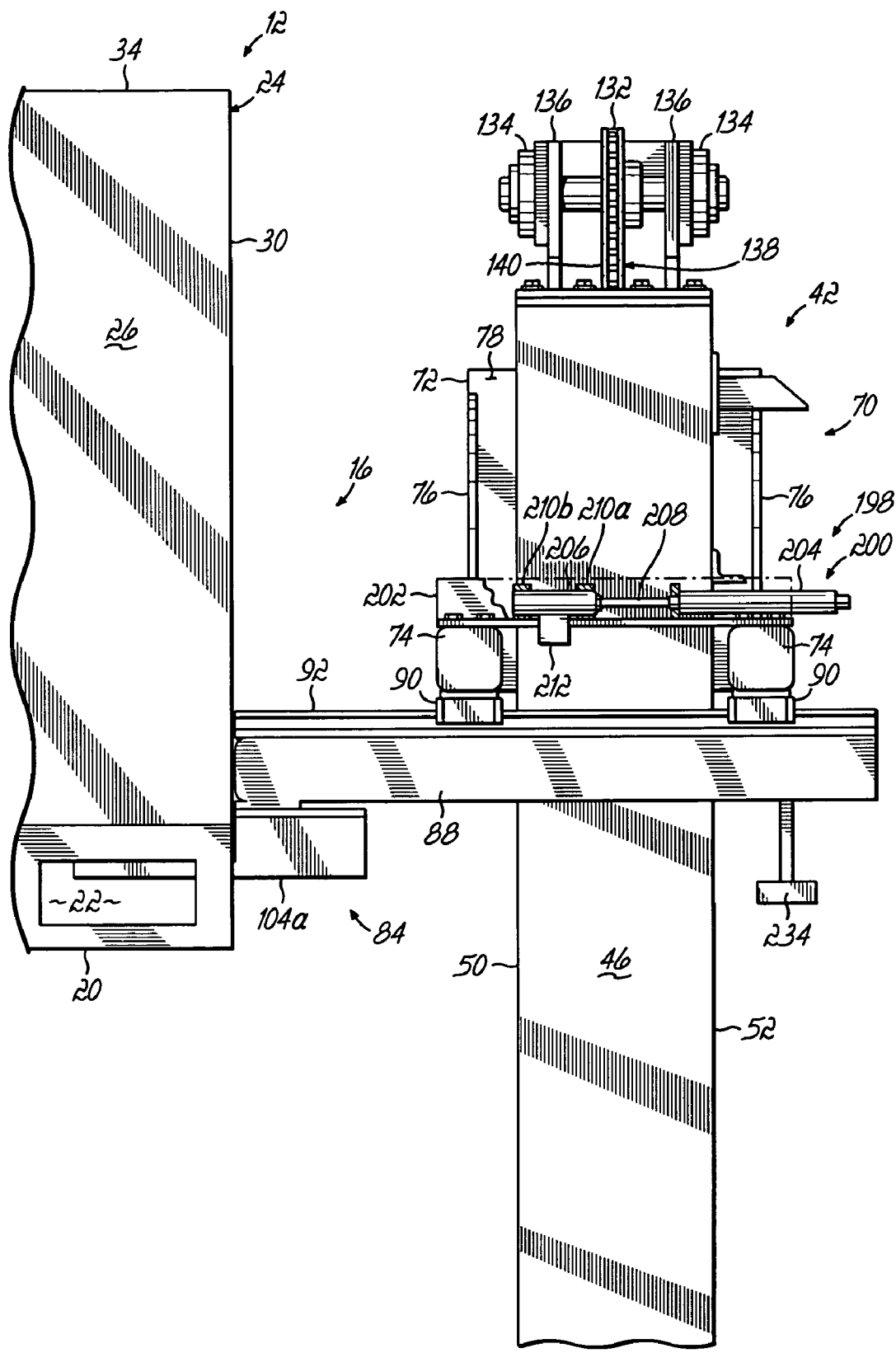
FIG. 7A is a view similar to FIG. 7, showing the locking mechanism in a "locked" position.

Each of the pair of pallet lift foot assemblies 84 has a pair of pallet lift feet 104a, 104b mounted beneath the respective machine direction (MD) inner member 86 and cross machine direction (CMD) members 88 of the pallet lift foot assemblies 84. When the pallet lift foot assemblies 84 are actuated to engage a first loaded pallet 12 as shown in FIGS. 2A, 7 and 7A, the respective pairs of pallet lift feet 104a and 104b engage the first loaded pallet 12 within the gap 22 (FIGS. 2A and 7) defined between the pallet top member (not shown) and the pallet base member (not shown). Each pallet lift carriage 70 is provided with a carriage grip completion switch (not shown) proximate its front foot 104a which, when actuated, arrests the cross machine direction (CMD) movement of the pair of pallet lift foot assemblies 84 when engaging a first loaded pallet 12. The structure and operation of the grip completion switch (not shown) is fully described in commonly owned U.S. Pat. No. 6,422,806, hereby incorporated herein by reference in its entirety, to which the reader is referred. It will be appreciated that other means known to those of ordinary skill in the art are possible as well for arresting the cross machine direction (CMD) movement of the pair of pallet lift foot assemblies 84 when engaging a first loaded pallet 12.

Figure 12A:
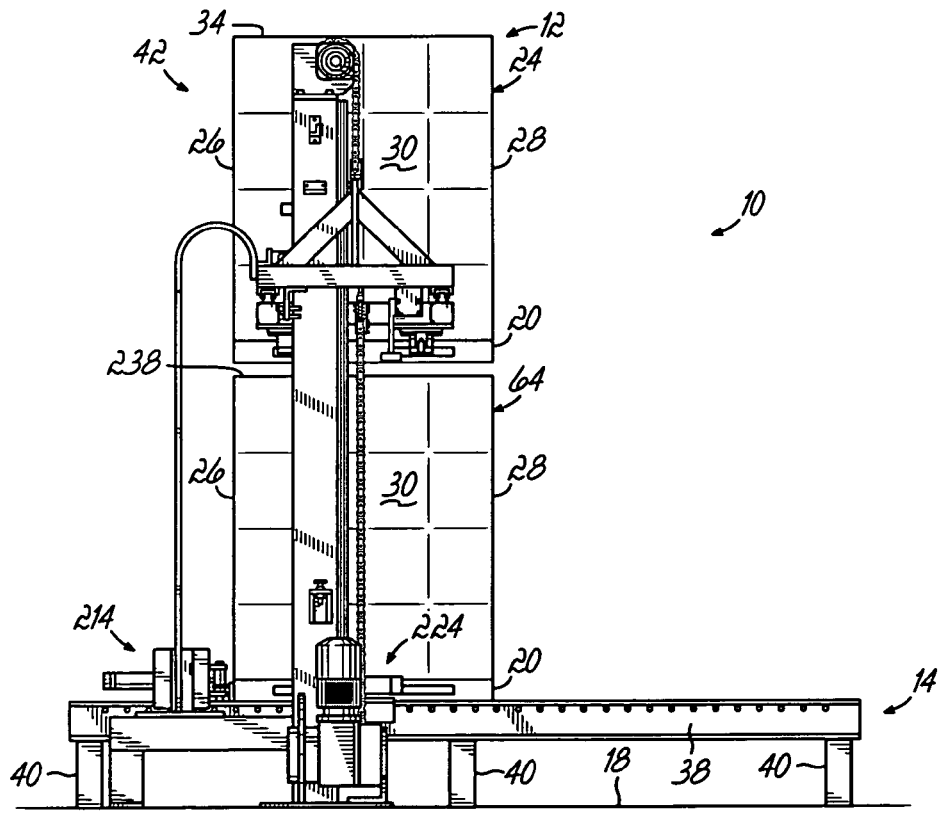
Figure 12B:
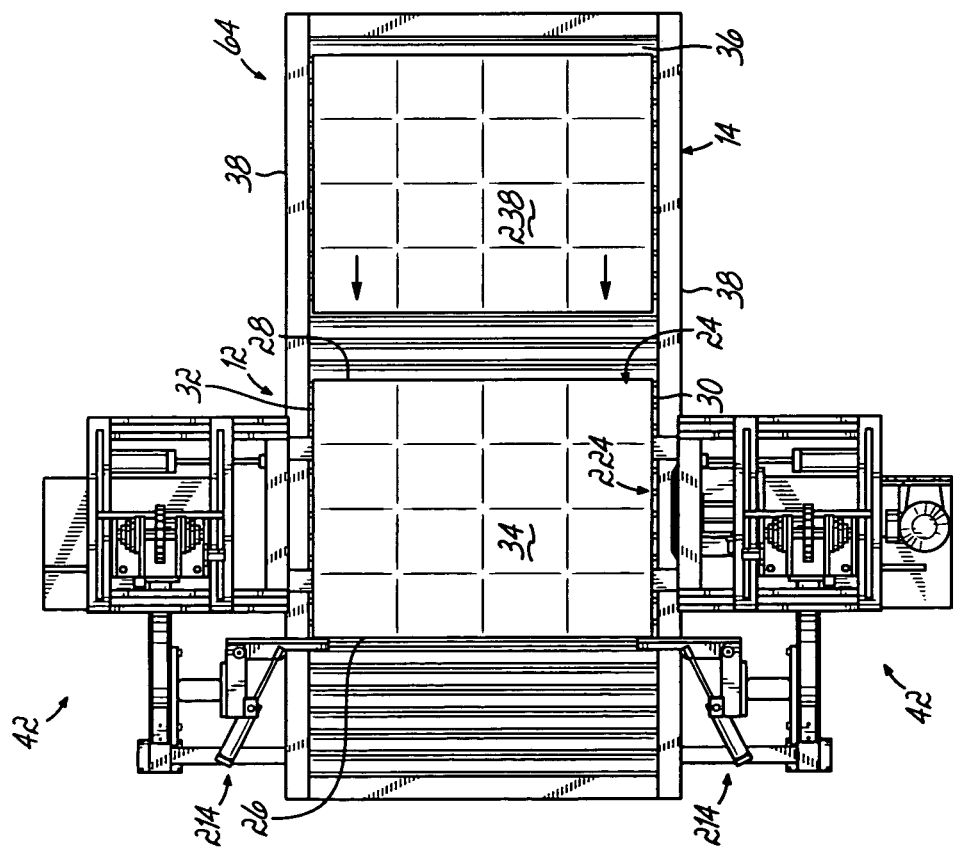

Each pallet lift carriage 70 is further provided with a carriage disengagement switch 106 proximate its rear foot 104b as shown in FIGS. 2 and 2A. The disengagement assembly 106 is pivotally mounted to a switch bracket 108 mounted beneath the rear cross machine direction (CMD) member 88 of the respective pallet lift foot assemblies 84. After the pallet lift feet 104a, 104b of the pallet lift carriages 70 have engaged the first loaded pallet 12, and as the pallet lift carriages 70 are vertically raised up to lift the first loaded pallet 12, a toe portion 110 of the disengagement assembly 106 is biased downward, thereby biasing upward a heel portion 112 which is normally downwardly biased by a compression spring (not shown) carried between the heel portion 112 and switch bracket 108. As the heel portion 112 of the disengagement assembly 106 is biased upwardly, the heel portion 112 is sensed by a disengagement proximity switch 114. After the first loaded pallet 12 has been upwardly vertically adjusted and a second loaded pallet 64 has been located in the stationary work station 16 as shown in FIGS. 12A and 12B, the first loaded pallet 12 is vertically lowered downward until it rests on the second loaded pallet 64. The downward movement of the pallet lift carriages 70 and, therefore, of the first loaded pallet 12 they carry, is arrested when, as the pallet lift carriages 70 continue to move vertically downward, pressure on the toe portion 110 of the disengagement assembly 106 is relieved and the compression spring (not shown) forces the heel portion 112 in a downward direction, thereby activating the disengagement proximity switch 114 for arresting the downward movement of the pallet lift carriages 70. The structure and operation of the carriage disengagement assembly 106 is fully described in commonly owned U.S. Pat. No. 6,422,806 to which the reader is referred.

The drive system 66 which operates the upward and downward vertical movement of the pallet carriage 70 is shown in FIGS. 1 and 8. The rotary output (not shown) of the drive system 66 is coupled in a conventional manner to a drive shaft 116 to thereby rotate the drive shaft during raising and lowering operations of the pallet lift carriages 70 as described in greater detail below. The drive shaft 116 is journaled in bearings 118 which are supported by brackets 120 mounted toward the lowermost portions of the respective support columns 42 so that the drive shaft 116 extends in the cross machine direction (CMD) beneath the conveyor 14.

In accordance with another aspect of the present invention, as shown in FIG. 8, the drive shaft 116 is segmented into three (3) shaft sections 122a, 122b and 122c. A first universal joint 124 is provided to couple drive shaft sections 122a and 122b, and a second universal joint 126 couples the drive shaft sections 122b and 122c. In this way, the segmented drive shaft 116 is capable of accommodating unevenness in the floor 18 which may occur on opposite sides of the conveyor 14.

The drive shaft 116 has a pair of drive sprockets 128 mounted for rotation therewith with each drive sprocket 128 partially extending into an opening 130 formed in rear sides 48 of the respective support columns 42. A pair of driven sprockets 132 are journaled in bearings 134 which are supported by brackets 136 mounted toward the uppermost portions of the respective support columns 42. Each drive sprocket 128 is linked to its respective driven sprocket 132 by a drive chain 138 carried by the drive and driven sprockets 128, 132 so that the drive chain 138 is carried about the drive and driven sprockets 128, 132 during rotation of the drive shaft 116. As shown in FIG. 4, one respective run 140 of each drive chain 138 travels within the chamber 54 of each respective support column 42 while the other respective run 142 travels parallel to the rear face side 48 of each support column 42. As each drive chain 138 travels about its respective drive sprocket 128, the drive chain 138 passes through the opening 130 formed in rear sides 48 of the respective support columns 42.

Figure 5:
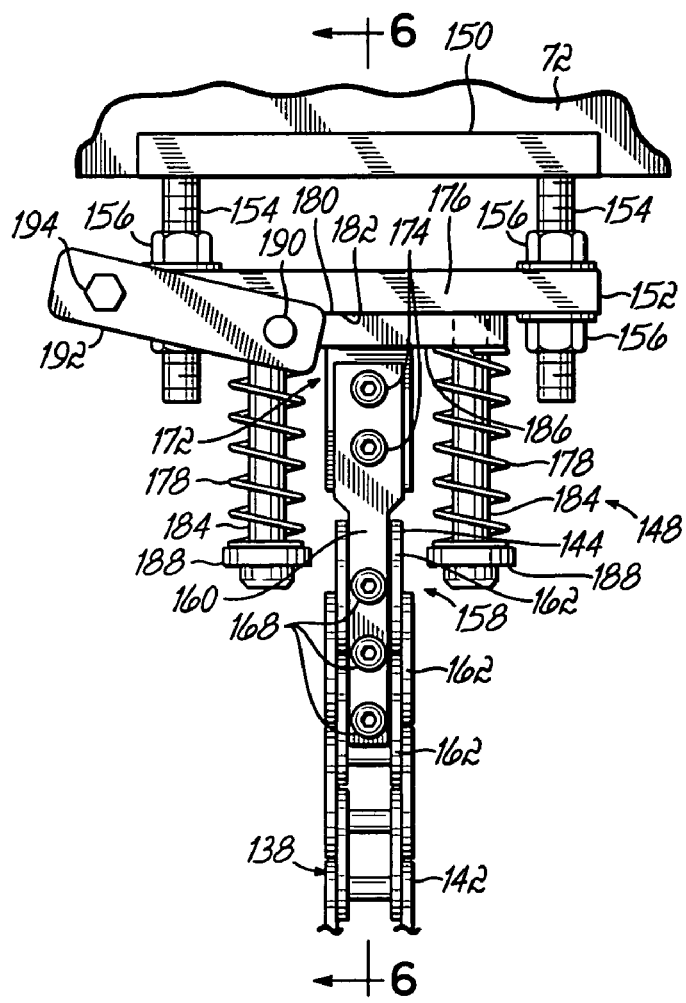
FIG. 5 is a side plan view of a spring-loaded chain tensioner in accordance with the principles of the present invention.
Figure 6:
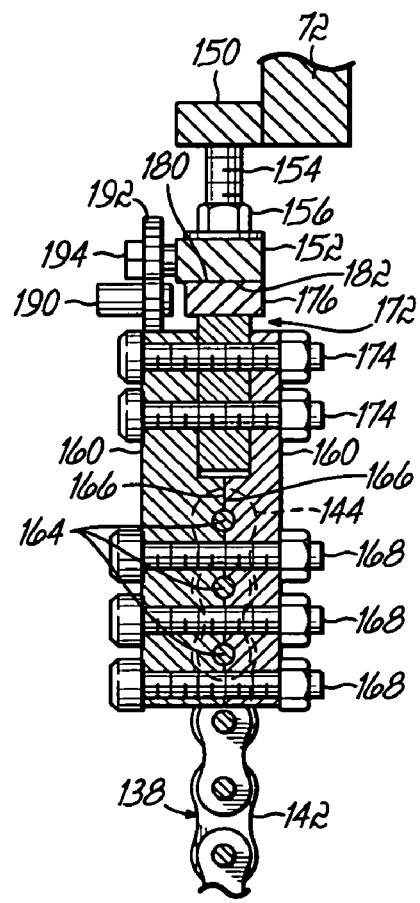
FIG. 6 is a cross-sectional view taken along line 6-6 of FIG. 5.

As shown in FIG. 4, the ends 144 and 146 of each drive chain 138 are connected respectively to lowermost and uppermost portions of each respective mounting plate 72. In accordance with another aspect of the present invention, as shown in FIGS. 5 and 6, a spring-loaded chain tensioner 148 is mounted to the lowermost portion of each respective mounting plate 72 and is provided to tension each drive chain 138 about its 20 respective pair of drive and driven sprockets 128, 132. Each chain tensioner 148 has a stationary member 150 mounted to the lowermost portions of the respective mounting plates 72 and an adjustable member 152 connected to the stationary member 150 through a pair of threaded shafts 154 which extend through unthreaded bores (not shown) formed through the adjustable member 152. Adjustment nuts 156 are threaded to the threaded shafts 154 to fix the adjustable member 152 in an adjusted vertical position relative to the stationary member 150.

Further referring to FIGS. 5 and 6, a chain attachment mechanism 158 is connected to each of the respective ends 144 of the drive chain 138. Each chain attachment mechanism 158 has a pair of chain clamping members 160 located on opposite sides of each respective drive chain end 144 which, in clamped relation, are configured to extend into multiple chain links 162, such as three (3) chain links, of the chain ends 144 and engage with link pins 164. In clamped relation as shown in FIG. 6, opposing faces 166 of the pair of chain clamping members 160 abut each other medially within the multiple chain links 162 so as to engage about the link pins 164. Transverse fasteners 168 are provided extending medially through the multiple links 162 to tighten the pair of clamping members 160 in clamped relation. It will be appreciated that, while not described herein, an identical chain attachment mechanism 158 is provided to connect the respective chain ends 146 to the uppermost portions of the mounting plates 72 as shown in FIG. 4.

Further referring to FIGS. 5 and 6, a sensor block 172 is mounted intermediate the pair of clamping members 160 through transverse fasteners 174 and is spring biased relative to the adjustable member 152. The sensor block 172 has a member 176 which is spring biased through a pair of biasing springs 178 so that its upper face 180 abuts with a lower face 182 of the adjustable member 152. As shown in FIG. 5, adjustable member 152 has a pair of shafts 184 extending from its lower face 182 which extend through the member 176 of the sensor block 172. The biasing springs 178 are located about the shafts 184 between a lower face 186 of the member 176 and annular flanges 188 provided at respective free ends of the shafts 184. In this way, the sensor block 172, and the drive chain end 144 attached thereto, are mounted to float relative to the adjustment member 152 on shafts 184 against the biasing force of the biasing springs 178.

An adjustable sensor 190 is mounted to a bracket 192 which is pivotally mounted through pivot 194 to the adjustable member 152 of each chain tensioner 148 as shown in FIGS. 5 and 6. The sensor 190 is electrically coupled to the controller (not shown) of the pallet stacker 10 and is operable to sense a predetermined separation distance of the sensor block member 176 relative to the adjustment member 152. The predetermined separation distance is selected so as to indicate that the pallet stacker 10 has jammed and the sensor 190, in response thereto, applies a signal to the controller (not shown) of the pallet stacker 10 to stop operation of the pallet stacker 10.

In accordance with another aspect of the present invention, the chain tensioner 148, while properly tensioning the drive chains 138 about the respective pairs of drive and driven sprockets 128 and 132, provides sufficient "play" so that the drive chains 138 are capable of jumping their respective drive sprockets 128. This "jumping" capability may be desirable when it is necessary to synchronize the vertical positions of the pallet lift carriages 70 relative to each other. In this instance, the pallet lift carriages 70 are each lowered to their lowered "home" position in contact with carriage stops 196 (FIGS. 1, 2, 2A, 4 and 8). If the pallet lift carriages 70 are not synchronized in vertical position, one of the pallet lift carriages 70 will arrive at its "home" position prior to the other pallet lift carriage 70 reaching its "home" position. The drive chain 138 of the first "home" reaching pallet lift carriage 70 will thereafter jump its respective drive sprocket 128 until the other pallet lift carriage 70 has reached its "home" position. While this synchronization occurs, the signal generated by the sensor 190, indicative of a pallet stacker jam, is ignored by the controller (not shown) of the pallet stacker 10 so that operation of the pallet stacker 10 is not stopped. A sensor (not shown) is associated with each support column 42 and applies a signal to the controller (not shown) of the pallet stacker 10 to indicate when each pallet lift carriage 70 is located at its "home" position. The upward and downward adjustment of the pallet lift carriages 70 are automatically limited by an up limit switch (not shown) and a down limit switch (not shown) provided on each of the support columns 42. As the pallet lift carriages 70 engage each of the respective up and down limit switches (not shown), the controller (not shown) of the pallet stacker 10 shuts off the drive system 66 and, thereby, limits upward and downward vertical adjustment of the pallet lift carriages 70 within the work station 16.

In accordance with yet another aspect of the present invention, as shown in FIGS. 7 and 7A, the pallet stacker 10 has a locking mechanism 198 associated with each pallet lift carriage 70 in order to provide a safe work environment for those in proximity to the pallet stacker 10 and to guard against undesired movement of the pallet lift carriages 88 due to motor malfunction. Each locking mechanism 198 has an air actuated piston assembly 200 mounted to a bracket 202 which is supported on respective front ends of the machine direction (MD) members 74 of the pallet lift carriages 70. Each piston assembly 200 has an air pressure actuated cylinder 204 connected to its respective bracket 202 and a locking pin 206 mounted to a cylinder rod 208. Each cylinder rod 208 travels in and is actuated by the respective air pressure actuated cylinders 204 so as to be extendable and retractable relative thereto in the cross machine direction (CMD). A pair of spaced annular rings 210a, 210b are mounted to the respective brackets 202 through which the locking pins 206 travel. A block 212 is mounted to the front side 46 of each support column 42 so that in a raised vertical position of the pallet lift carriages 70, the locking pins 206 are positioned at a height above the blocks 212.

In its "unlocked" position as shown in FIG. 7, the locking pin 206 is retracted and is positioned only within annular ring 210a. In this "unlocked" position, the block 212 on each support column 42 is free to pass between the annular rings 210a, 210b as the pallet lift carriages 70 are vertically adjusted within the work station 16 during a pallet stacking operation. However, in its "locked" position as shown in FIG. 7A, each locking pin 206 is extended in the cross machine direction (CMD) above its respective block 212 and is positioned within both annular rings 210a, 210b. The locking pins 206 engage their respective blocks 212 to prevent undesired downward movement of the pallet lift carriages 70, such as during maintenance or other adjustment of the pallet stacker 10. Actuation of the locking mechanisms 198 occurs when air pressure is removed from the pallet stacker 10. The locking pins 206 are spring driven to extend to their "locking" position. Air pressure present at the pallet stacker 10 holds the locking pins 206 in their "unlocked" position. When air pressure is removed from the pallet stacker 10 via a main dump valve (not shown), the locking pins 206 are spring driven to their "locked" position.

Figure 9A:
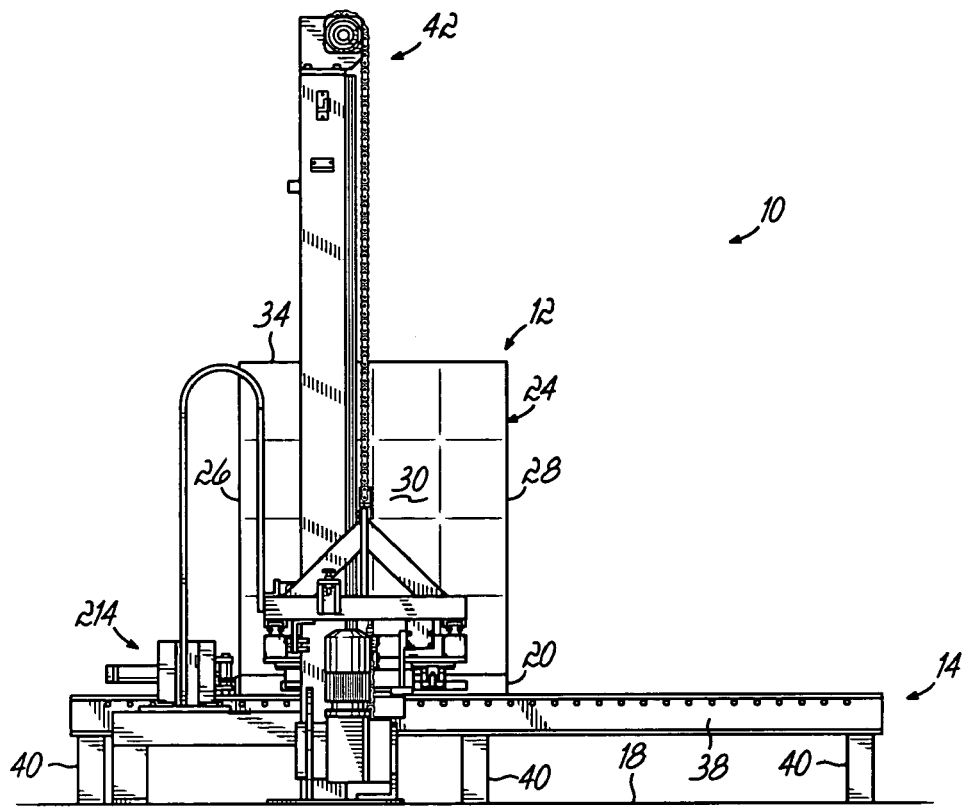
FIGS. 9A, 10A, 11A, 12A, 13A and 14A are side plan views of the pallet stacker of FIG. 1, illustrating operation of the pallet stacker in stacking loaded pallets in accordance with the principles of the present invention.
Figure 9B:
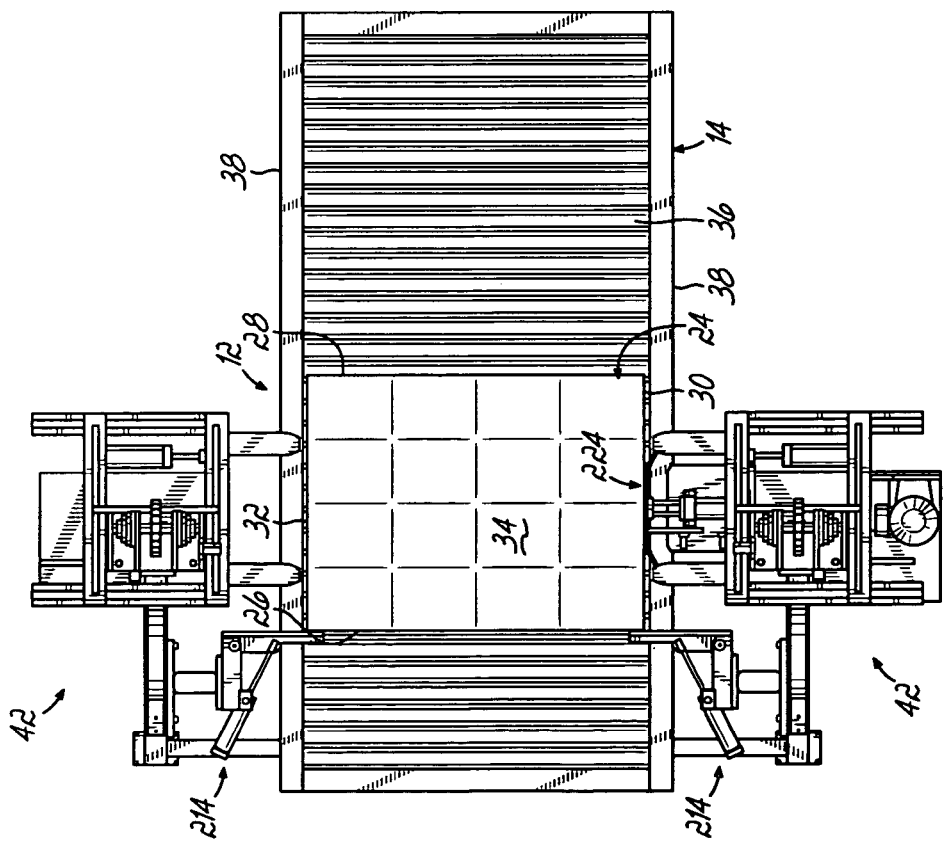

In accordance with the principles of the present invention, the pallet stacker 10 carries out a unique method for stacking first and second loaded pallets 12, 64 as shown in FIGS. 9A-14A and FIGS. 9B-14B. As shown in FIGS. 9A and 9B, a first loaded pallet 12 is moved by conveyor 14 in the pallet stacker machine direction (MD) as indicated by arrow MD until it is located in the entry position of the stationary work station 16, which entry position is located between the support columns 42 and the respective lowered pallet lift carriages 70. At this time, as shown in FIGS. 9A and 9B, the pallet lift carriages 70 are disengaged from the opposite sides of the pallet 20. As the first loaded pallet 12 is conveyed to the pallet stacker 10, a first pallet height sensor (not shown) senses the presence of the first loaded pallet 12 and whether the first loaded pallet 12 complies with the preferred load height H (FIG. 7). A pair of load sensors (not shown) determine whether the first loaded pallet 12 complies with the preferred load integrity V (FIG. 7). The structure and operation of first pallet height sensor (not shown) and the pair load sensors (not shown) are fully described in the commonly assigned U.S. Pat. No. 6,422,806 to which the reader is referred.

As the first loaded pallet 12 approaches the work station 16 in the machine direction (MD), the forward movement of the pallet 20 on the driven conveyor 14 is arrested by pallet stops 214 that engage the first pallet's leading edge 216 to locate the first loaded pallet 12 in a positive fashion in the work station 16 where the leading edge is aligned or registered at a preferred machine direction (MD) position in the machine direction (MD) as shown in FIGS. 9A and 9B. A stop sensor (not shown) functions to initiate a time delay in the conveyor drive (not shown) after the first loaded pallet 12 enters the work station 16 so that the conveyor 14 continues to push the pallet 20 against the pallet stops 214 to correct any misalignment or cocking of the pallet relative to its machine direction (MD) preferred position in the work station 16.

As shown in FIG. 3, the pallet stops 214 each include a stop arm 218 that is pivotally attached to a bracket 220 mounted to the respective support braces 56 of the support columns 42. Each stop arm 218 is extended into the cross machine direction (CMD) by an air actuated cylinder 222 pivotally fixed to the bracket 220. Each pallet stop 214 includes a first and a second proximity sensor (not shown) which sense extension and retraction, respectively, of the stop arm 218. The structure and operation of the first and second proximity sensors (not shown) is fully described in commonly assigned U.S. Pat. No. 6,422,806 to which the reader is referred. As the first and second loaded pallets 12, 64 successively engage the stop arms 218, those first and second loaded pallets are thereby aligned and registered in the proper machine direction (MD) entry position of the work station 16.

The first and second loaded pallets 12, 64 are then aligned or registered in the cross machine direction (CMD) at the work station 16 by a CMD pusher system 224, shown in FIG. 3, that may include a pusher plate 226 attached to the rod end of an air pressure cylinder 230 linked to an air pressure source (not shown). The CMD pusher system 224 has first and second proximity switches 232a, 232b which sense retraction and extension, respectively, of the pusher plate 226.

Figure 10A:
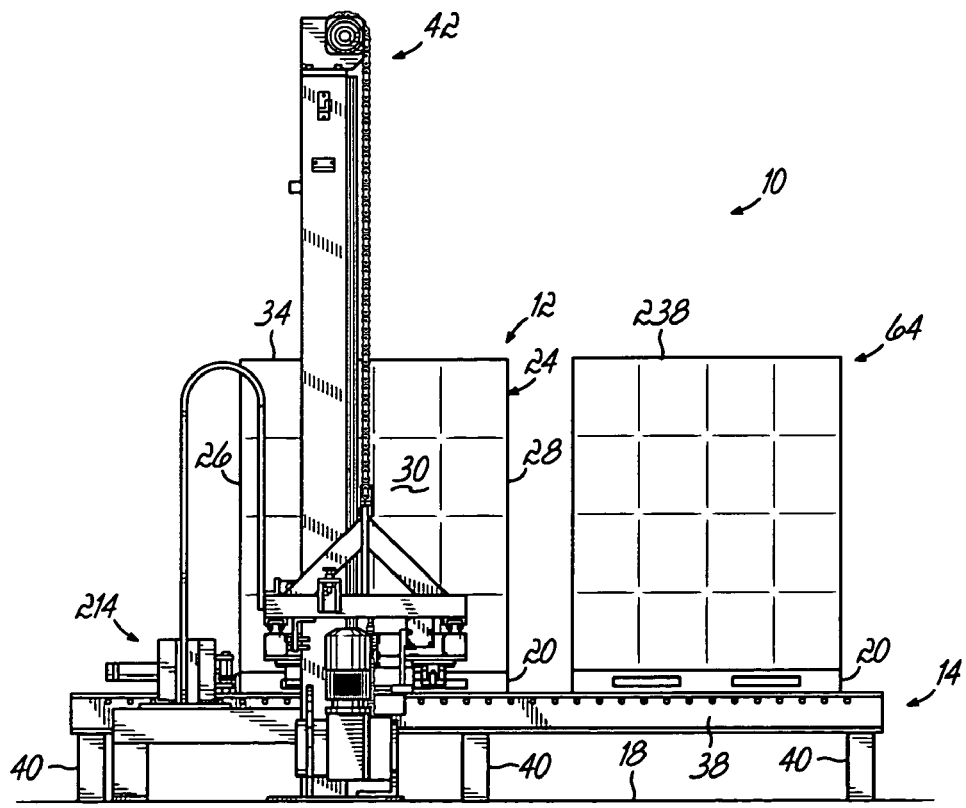
Figure 10B:
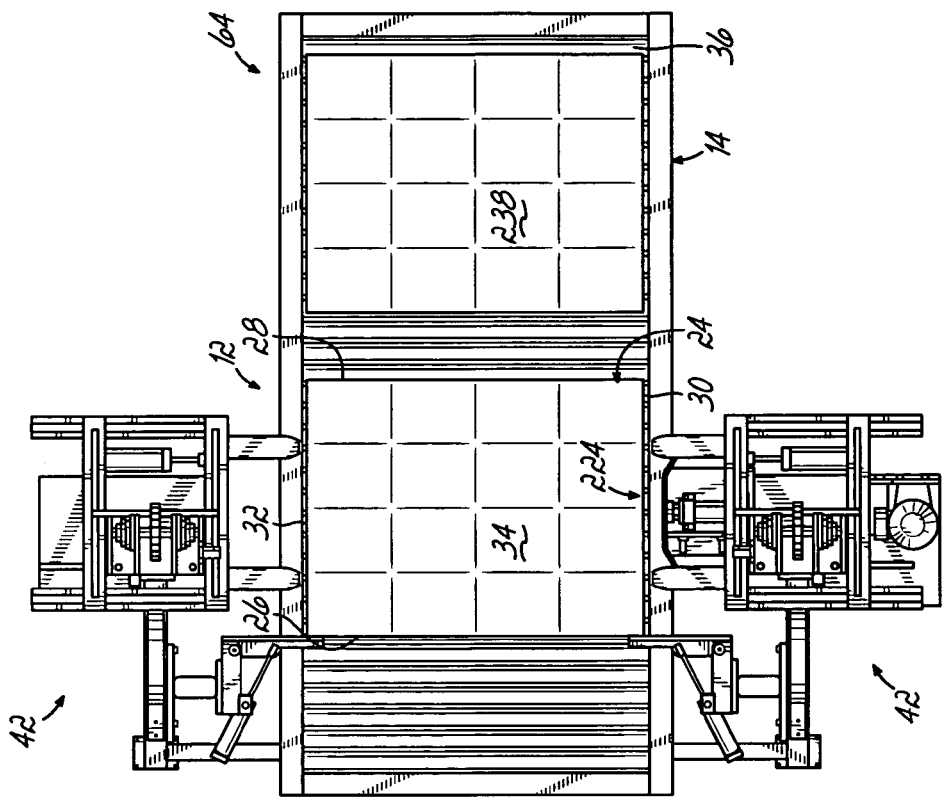
FIGS. 9B, 10B, 11B, 12B, 13B and 14B are top plan views of the pallet stacker corresponding to FIGS. 9A, 10A, 11A, 12A, 13A and 14A, respectively.

By using the stop sensor (not shown), pallet stops 214, and pusher system 224, the pallet stacker 10 may be advantageously used with any conventional conveyor 14, such as belt driven and chain driven roller conveyors by way of example only. However, the pallet stacker 10 is especially useful with belt driven roller conveyors. In belt driven roller conveyor systems, a belt (not shown) beneath conveyor rollers 36 disengages the rollers 36 when it is desired to stop forward movement of the conveyor 14. The pallet stops 214 arrest the movement of the loaded pallet upon the conveyor 14, which would otherwise be carried by forward momentum through the preferred registration or entry position within the stationary work station 16 as the second loaded pallet 64 is conveyed on the conveyor 14 to an infeed position of the pallet stacker 10 as shown in FIGS. 10A and 10B. A control (not shown) of the conveyor 14 signals the controller (not shown) of the pallet stacker 10 that the second loaded pallet 64 is present at the infeed position of the pallet stacker 10 as shown in FIGS. 10A and 10B.

Figure 11A:
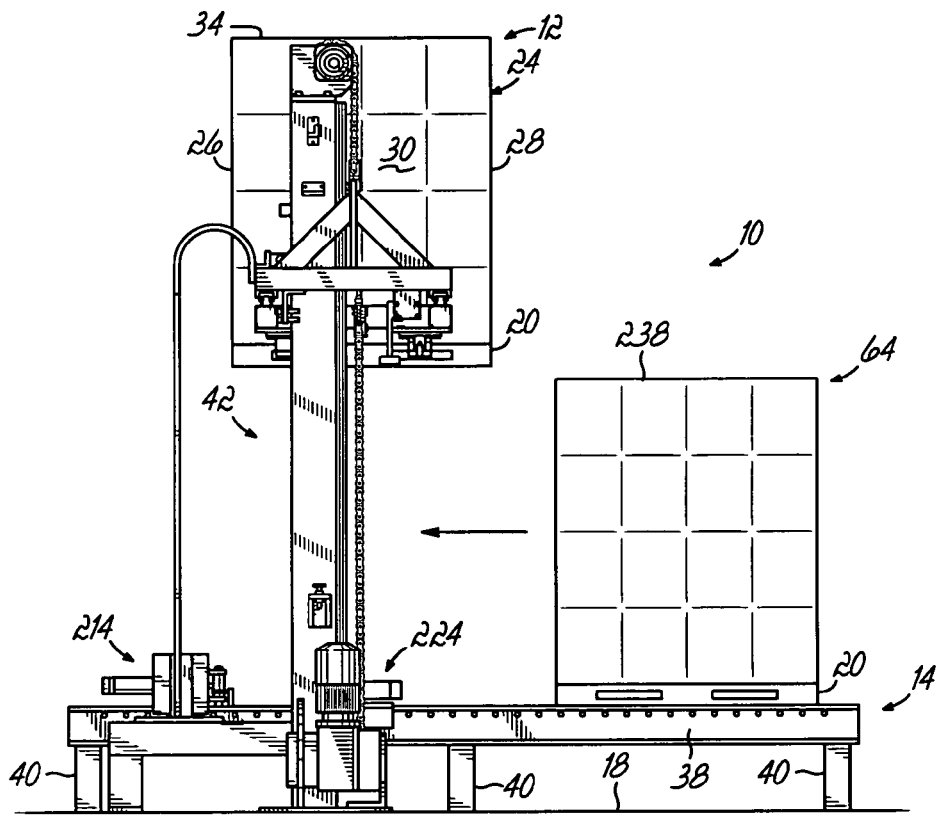
Figure 11B:
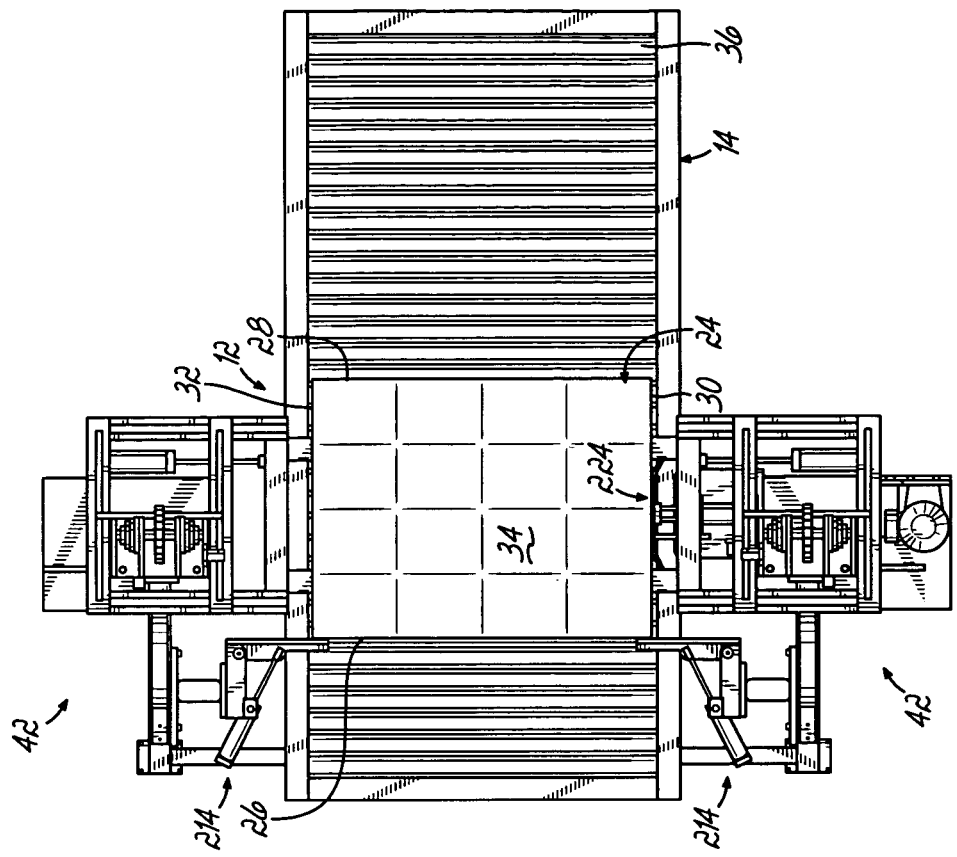

Subsequently, as shown in FIGS. 11A and 11B, the pair of pallet lift carriages 70 are moved horizontally in the cross machine direction (CMD) until the pallet lift feet 104a, 104b engage the opposite sides of the first loaded pallet 12 while it is still in the entry position. The horizontal engaging motion of the pallet lift foot assemblies 84 is arrested as the carriage grip switch (not shown) senses when the feet 104a, 104b are sufficiently operatively engaged with the first loaded pallet 12 so that the first loaded pallet 12 can be vertically lifted above the entry position as shown in FIGS. 11A and 11B.

In accordance with still another aspect of the present invention, a photo eye sensor 234 (FIGS. 2, 2A, 4, 7 and 7A) is electrically coupled to the controller (not shown) of the pallet stacker 10 and is supported by a bracket 236 mounted to the rear cross machine direction (CMD) member 88 of one of the pallet lift foot assemblies 84. As the first loaded pallet 12 is vertically lifted within the work station 16, the photo eye sensor 234 detects the height of the second loaded pallet 64 and causes the controller (not shown) of the pallet stacker 10 to stop continued upward vertical movement of the first loaded pallet 12 when the pallet lift carriages 70 are located in a range of about 3 to about 7 inches above the sensed height of the incoming second loaded pallet 64. Of course, other clearance ranges of the pallet lift carriages 70 are possible as well without departing from the spirit and scope of the present invention. This results in the first loaded pallet 12 having located in a temporary elevated holding position in the work station 16 that is away from the stationary entry position of the work station 16 as shown in FIGS. 11A and 11B. By sensing the height of the incoming second loaded pallet 64, and moving the pallet lift carriages 70 only to a height sufficient to clear the top 238 of the second loaded pallet 64, the pallet stacker 10 minimizes inefficient movement of the pallet lift carriages 70 during the pallet stacking operation.

As shown in FIGS. 11A-11B and FIGS. 12A-12B, the second loaded pallet 64 is thereafter conveyed on the conveyor 14 in the direction of arrows 240 in FIGS. 11A and 11B to the entry position as shown in FIGS. 12A and 12B. The first height sensor (not shown) senses the preferred load height H of the second loaded pallet 64 as it is conveyed to the entry position and the pair of load sensors (not shown) sense the preferred load integrity V of the second loaded pallet 64 to determine whether the first loaded pallet 12 may be stacked in stable relation with the second loaded pallet 64. As the second loaded pallet 64 is received in the work station 16, the stop sensor (not shown) senses the second loaded pallet's leading edge 216, the machine direction (MD) movement of the conveyor 14 is stopped, and the stop arms 218 engage the second pallet's leading edge 216 to arrest that second loaded pallet 64 in the entry position. As the second loaded pallet 64 engages the stop arms 218, it is thereby aligned and registered in the proper machine direction (MD) entry position of the work station 16. The second loaded pallet 64 is then aligned or registered in the cross machine direction (CMD) at the work station 16 by the CMD pusher system 224, shown in FIG. 3.

Figure 13A:
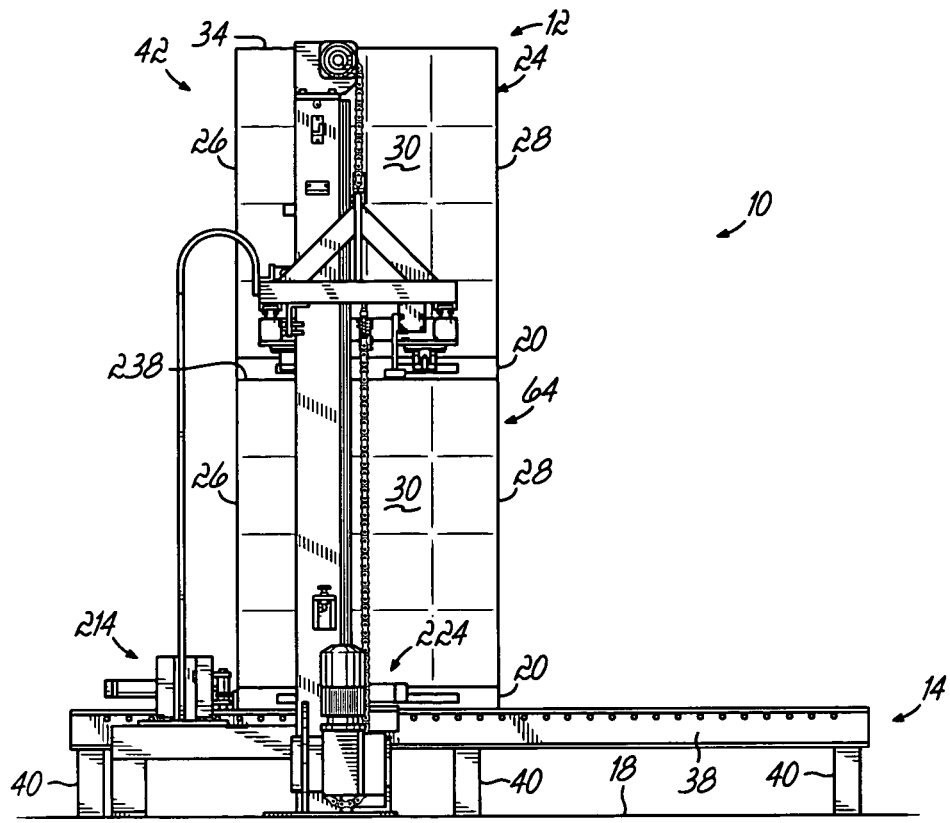
Figure 13B:
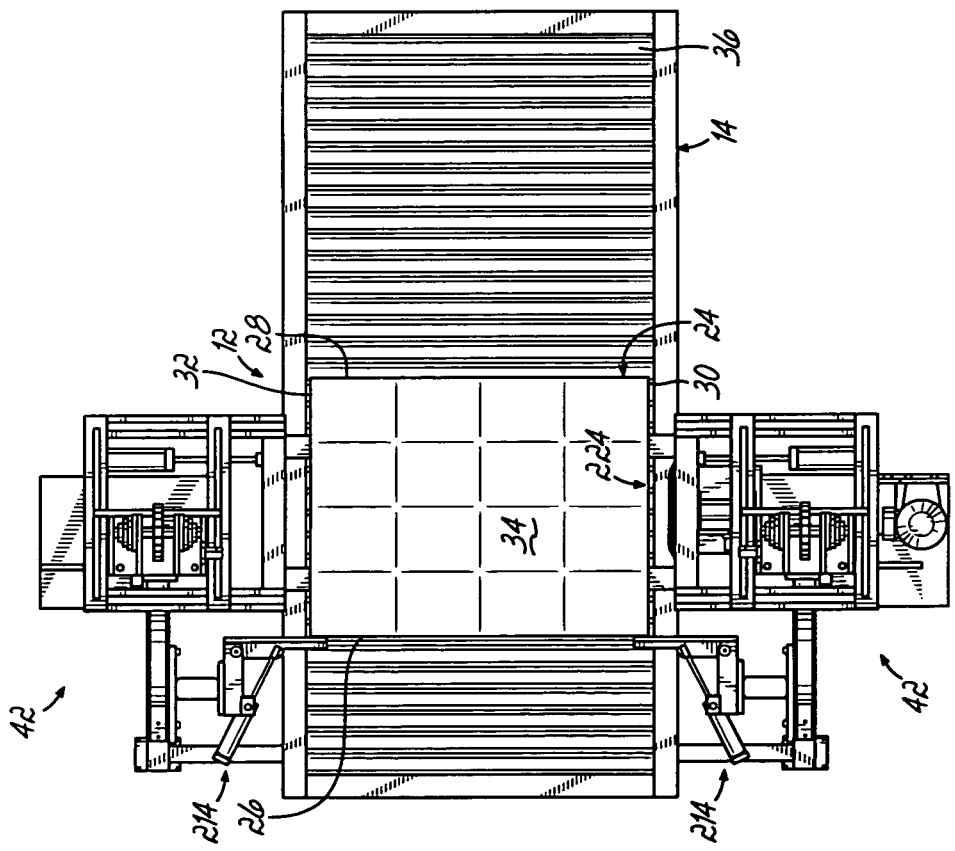

The first loaded pallet 12 is then moved in a reverse or downward vertical direction into stacked relation with the second loaded pallet 64 as shown in FIGS. 13A and 13B. The carriage disengagement assembly 106 provided on each of the pallet lift carriages 70 senses when the pallet lift carriages 70 no longer carry the weight of the first loaded pallet 12 after that first pallet is placed in stable stacked relation with the second loaded pallet 64, thereby allowing the pallet lift carriages 70 to be disengaged from the first loaded pallet 12. The pair of lift foot assemblies 84 are then horizontally moved outwardly to disengage the pallet lift carriages 70 from the first loaded pallet 12.

Figure 14A:
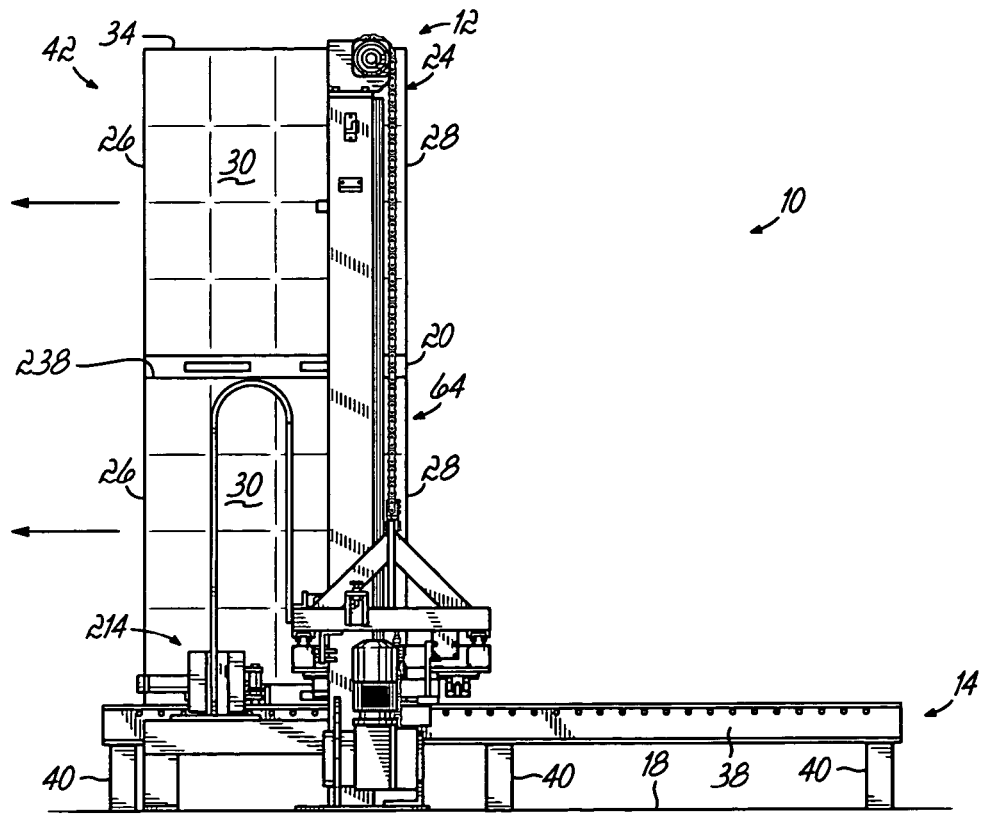
Figure 14B:
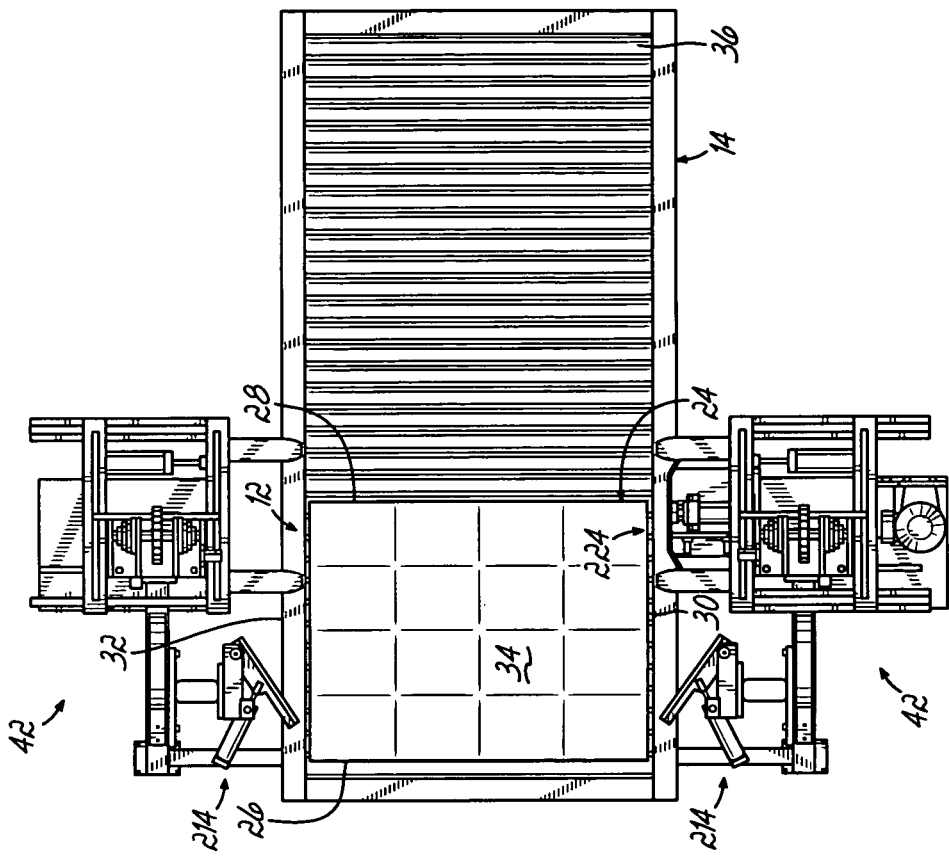

A second height sensor (not shown) senses when the first loaded pallet 12 has been stacked on top of the second loaded pallet 64 and triggers the stop arms 218 to disengage from the second loaded pallet. The structure and operation of the second height sensor (not shown) is fully described in commonly assigned U.S. Pat. No. 6,422,806 to which the reader is referred. This allows the conveyor 14 to transport the now stacked first and second loaded pallets 12, 64 away from the stationary work station 16 of the pallet stacker 10 as shown in FIGS. 14A and 14B.

The pallet stacker 10 of the present invention, due to its unique modular construction using the pair of elongated, vertically oriented support columns 42, occupies a minimal amount of floor space for a pallet stacking operation. The segmented drive shaft 116 accommodates for unevenness in the floor 18 and the location of the drive system 66 near the base of the pallet stacker 10 greatly simplifies maintenance of the system. The locking mechanism 198 provides for safe operation of pallet stacker 10 during maintenance or other events wherein vertical movement of the pallet lift carriages 70 is undesired. The selective engagement of the pallet lift carriages 70 with the loaded pallets, and the controlled vertical movement of pallet lift carriages 70 provided by the pallet height sensing photo eye 234, enable the pallet stacker 10 to perform stacking operations in a highly efficient manner. The spring-loaded chain tensioners 148, in combination with the "jumping" ability of the drive chains 138, permit accurate synchronization of the pallet lift carriages 70 for safe and reliable pallet stacking operations. The chain tensioners 138 also sense jam conditions of the pallet stacker 10 to ensure safe and reliable pallet stacking operation.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. For example, the pallet stacker 10 of the present invention is capable of stacking more than two loaded pallets as well. Accordingly, departures may be made from such details without departing from the spirit or scope of applicant's general inventive concept.

Having described the invention, I claim:

1. A pallet stacker for stacking loaded pallets one on top of the other, each pallet having a leading edge, a trailing edge, and opposing sides and being adapted to carry a load, said pallet stacker comprising:

a stationary work station having first and second elongated support columns between which a first pallet having a first load may be located;

a first pallet lift carriage in operational engagement with one of said first and second support columns and being selectively engageable with said first pallet on one of said pallet's opposing sides;

a second pallet lift carriage in operational engagement with the other of said first and second support columns and being selectively engageable with said first pallet on the other of said pallet's opposing sides;

each of said first and second lift carriages and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet;

a drive system having an output in operational engagement with said first and second pallet lift carriages for driving vertical adjustment of said first and second pallet lift carriages;

a first drive chain having a first end and a second end, said first drive chain being in operational engagement with said output of said drive system and having said first end of the first drive chain fixed relative to said first pallet lift carriage;

a second drive chain having a first end and a second end, said second drive chain being in operational engagement with said output of said drive system and having said first end of the second drive chain fixed relative to said second pallet lift carriage; and a spring-loaded chain tension mechanism associated with at least one of said second ends of said first and second drive chains, said chain tension mechanism being operable to change its configuration so as to allow said at least one second end of said first and second drive chains to float relative to a respective one of said first and second pallet lift carriages to thereby allow for vertical adjustment of one of said first and second pallet lift assemblies relative to the other.

2. The pallet stacker of claim 1, further comprising:
a sensor associated with said chain tension mechanism and operable to detect a change in the configuration of said chain tension mechanism.

3. The pallet stacker of claim 1, further comprising:
a first pallet lift foot assembly associated with said first pallet lift carriage; and
a second pallet lift foot assembly associated with said second pallet lift carriage,
one of said first and second pallet lift foot assemblies being selectively engageable with one of said first pallet's opposing sides and the other of said first and second pallet lift foot assemblies being selectively engageable with the other of said first pallet's opposing sides.

4. The pallet stacker of claim 1, further comprising:
a rotatable drive shaft in operational engagement with said output of said drive system and said first and second pallet lift carriages.

5. The pallet stacker of claim 4, wherein said drive shaft is segmented into a plurality of shaft segments and includes at least one universal joint operable to couple said shaft segments.

6. The pallet stacker of claim 1, wherein said drive system comprises:
a variable frequency drive controller; and
an electric brake motor.

7. The pallet stacker of claim 1, further comprising:
a conveyor for moving each of the first and second loaded pallets into the work station.

8. A pallet stacker for stacking loaded pallets one on top of the other, each pallet having a leading edge, a trailing edge, and opposing sides and being adapted to carry a load, said pallet stacker comprising:
- a stationary work station having first and second elongated support columns between which a first pallet having a first load may be located;
- a first pallet lift carriage in operational engagement with one of said first and second support columns and being selectively engageable with said first pallet on one of said pallet's opposing sides;
- a second pallet lift carriage in operational engagement with the other of said first and second support columns and being selectively engageable with said first pallet on the other of said pallet's opposing sides;
- each of said first and second lift carriages and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and
- a locking mechanism, comprising:
  - a member projecting from each of said first and second elongated support columns;
  - an extendable and retractable locking device supported by each of said first and second pallet lift carriages; and
  - an actuator operatively coupled to said locking device and being configured to retract said locking device,
  - each of said locking devices being operable, in an extended position, to engage said respective projecting members to support said first and second pallet lift carriages in a vertically raised position and, in a retracted position in response to operation of said actuator, to disengage from said respective projecting members to permit downward vertical movement of said first and second pallet lift carriages.

9. The pallet stacker of claim 8, further comprising:
a conveyor for moving each of the first and second loaded pallets into the work station.

10. A pallet stacker for stacking loaded pallets one on top of the other, each pallet having a leading edge, a trailing edge, and opposing sides and being adapted to carry a load, said pallet stacker comprising:
- a stationary work station having first and second elongated support columns between which a first pallet having a first load may be located;
- a controller associated with said stationary work station;
- a first pallet lift carriage in operational engagement with one of said first and second support columns and being selectively engageable with said first pallet on one of said pallet's opposing sides;
- a second pallet lift carriage in operational engagement with the other of said first and second support columns and being selectively engageable with said first pallet on the other of said pallet's opposing sides;
- each of said first and second lift carriages and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and
- a sensor operatively coupled to said controller of said work station and being operable to detect a height of the second loaded pallet as it approaches said work station,
- said controller associated with said work station being responsive to said sensor and operating said work station for raising said first and second pallet lift carriages and, therefore, said first loaded pallet when same is selectively engaged therewith, to a raised height above the detected height of the second loaded pallet prior to the second pallet being located within said work station beneath the first loaded pallet, the raised height of said first and second pallet lift carriages being variable depending on the detected height of the second loaded pallet.

11. The pallet stacker of claim 10, further comprising:
a conveyor for moving each of the first and second loaded pallets into the work station.

12. A method for stacking loaded pallets one on top the other, said method comprising the steps of:
- locating a first pallet having a first load in an entry position at a stationary stacking work station,
- engaging a pair of pallet lift carriages in operational relation with said first pallet at said entry position of said work station, the height of said pallet lift carriages and therefore of the first pallet carried thereby, being vertically adjustable,
- sensing an uppermost height of a second pallet having a second load as it approaches the entry position,
- moving said first loaded pallet in a vertical direction relative to said entry position by use of said pallet lift carriages to a temporary holding position in said work station above the sensed uppermost height of the second loaded pallet, the temporary holding position being located at a height that is variable depending on the sensed uppermost height of the second loaded pallet,
- locating the second loaded pallet in said entry position of said stationary work station, and
- moving said first loaded pallet in a reverse vertical direction relative to said entry position into a stacked relation with said second loaded pallet in said work station.

13. The method of claim 12 further comprising steps of:
providing at least a pallet lift foot assembly on each of said pair of pallet lift carriages,
moving each of said pallet foot assemblies substantially horizontally for engaging said respective pallet lift carriages with said first loaded pallet when said first loaded pallet is in said entry position, and
moving each of said pallet foot assemblies substantially horizontally for disengaging said respective pallet lift carriages with said first loaded pallet when said first loaded pallet has been located in stacked relation with said second loaded pallet.

14. The method of claim 12 further comprising the steps of:
mounting a rotatable drive shaft in operational engagement with said pair of pallet lift assemblies, and
rotating said drive shaft to move said pair of pallet lift assemblies and the first loaded pallet engaged thereby in a vertical direction relative to said entry position to a position above the sensed height of the second loaded pallet.

15. The method of claim 14 further comprising the step of:
rotating said drive shaft to move said pair of lift assemblies and the first loaded pallet engaged thereby in a reverse vertical direction to stack the first loaded pallet upon the second loaded pallet.

16. The method of claim 12, further comprising the steps of:
  conveying the first loaded pallet on a conveyor to said work station,
  thereafter conveying the second loaded on the conveyor to said work station, and
  thereafter conveying the first and second loaded pallets in stacked relation one with the other away from the work station.

* * * * *

UNITED STATES PATENT AND TRADEMARK OFFICE
CERTIFICATE OF CORRECTION

| | | |
|---|---|---|
| PATENT NO. | : 7,717,665 B2 | Page 1 of 2 |
| APPLICATION NO. | : 10/973367 | |
| DATED | : May 18, 2010 | |
| INVENTOR(S) | : Gary E. Jenkins | |

It is certified that error appears in the above-identified patent and that said Letters Patent is hereby corrected as shown below:

Cover page, Abstract (57), line 2, change "second loaded pallets includes" to --second loaded pallets include--.

Cover page, Abstract (57), line 4, change "A pair of pallet lift carriages are" to --A pair of pallet lift carriages is--.

In column 2, line 20, change "cost and frequency of maintenance is reduced" to --cost and frequency of maintenance are reduced--.

In column 3, line 56, change "vertically adjust the first loaded pallet" to --vertically adjusts the first loaded pallet--.

In column 4, line 60, change "FIG. 8 is partial rear view" to --FIG. 8 is a partial rear view--.

In column 9, line 6, change "about its 20 respective pair of drive" to --about its respective pair of drive--, as shown in the specification at Page 19, line 20.

In column 10, line 19, change "The upward and downward adjustment" to --The upward and downward adjustments--.

In column 11, line 19, change "A pair of load sensors (not shown) determine" to --A pair of load sensors (not shown) determines--.

In column 12, line 16, change "the pair of pallet lift carriages 70 are" to --the pair of pallet lift carriages 70 is--.

In column 12, line 55, change "the pair of load sensors (not shown) sense" to --the pair of load sensors (not shown) senses--.

In column 13, line 12, change "pair of lift foot assemblies 84 are" to --pair of lift foot assemblies 84 is--.

Signed and Sealed this

Fifth Day of October, 2010

David J. Kappos
*Director of the United States Patent and Trademark Office*

CERTIFICATE OF CORRECTION (continued)
U.S. Pat. No. 7,717,665 B2

In claim 16, column 17, line 5, change "thereafter conveying the second loaded on the conveyor" to --thereafter conveying the second loaded pallet on the conveyor--.